(12) United States Patent
Nimura

(10) Patent No.: US 8,621,729 B2
(45) Date of Patent: Jan. 7, 2014

(54) BUCKLE DEVICE

(75) Inventor: Yoichi Nimura, Osaka (JP)

(73) Assignee: Ashimori Industry Co., Ltd., Osaka (JP)

( * ) Notice: Subject to any disclaimer, the term of this patent is extended or adjusted under 35 U.S.C. 154(b) by 26 days.

(21) Appl. No.: 13/390,427

(22) PCT Filed: Oct. 12, 2010

(86) PCT No.: PCT/JP2010/068236
§ 371 (c)(1),
(2), (4) Date: Feb. 14, 2012

(87) PCT Pub. No.: WO2011/052414
PCT Pub. Date: May 5, 2011

(65) Prior Publication Data
US 2012/0137478 A1 Jun. 7, 2012

(30) Foreign Application Priority Data

Oct. 28, 2009 (JP) .................................. 2009-248050
Sep. 17, 2010 (JP) .................................. 2010-208940

(51) Int. Cl.
*A44B 11/26* (2006.01)
(52) U.S. Cl.
USPC ................................ 24/642; 24/641; 24/633
(58) Field of Classification Search
USPC ................................ 24/593.1, 633, 641, 642
See application file for complete search history.

(56) References Cited

U.S. PATENT DOCUMENTS

| | | | | |
|---|---|---|---|---|
| 5,159,732 A | * | 11/1992 | Burke | 24/641 |
| 6,233,794 B1 | * | 5/2001 | Kohlndorfer et al. | 24/641 |
| 6,329,893 B1 | * | 12/2001 | Furukawa et al. | 335/205 |
| 6,381,815 B1 | * | 5/2002 | Yamaguchi et al. | 24/633 |
| 7,657,979 B2 | * | 2/2010 | Midorikawa et al. | 24/633 |
| 2004/0107550 A1 | * | 6/2004 | Lee et al. | 24/633 |
| 2006/0261588 A1 | * | 11/2006 | Kohama | 280/801.1 |
| 2007/0271746 A1 | * | 11/2007 | Midorikawa et al. | 24/633 |

FOREIGN PATENT DOCUMENTS

| | | |
|---|---|---|
| EP | 0 965 504 A1 | 12/1999 |
| EP | 1 400 419 A1 | 3/2004 |
| JP | A-2000-004909 | 1/2000 |
| JP | A-2004-135776 | 5/2004 |

OTHER PUBLICATIONS

International Search Report in International Application No. PCT/JP2010/068236; dated Jan. 27, 2011.
Written Opinion of the International Searching Authority in International Application No. PCT/JP2010/068236; dated Jan. 27, 2011.

* cited by examiner

*Primary Examiner* — Robert J Sandy
*Assistant Examiner* — David Upchurch
(74) *Attorney, Agent, or Firm* — Oliff & Berridge, PLC

(57) ABSTRACT

A frame member, which is approximately U-shaped in side view, has an ejector having elastic locking pieces whose tips are configured to move along long holes formed in an upper plate, mounted thereon. A permanent magnet is mounted on a slider member, at the end portion closer to a Hall IC switch. Pairs of elastic engagement pieces are inserted through the long holes respectively, and engaged with engagement portions provided at the tips of elastic engagement pieces of the ejector respectively and thus assembled. In a base member formed approximately rectangular-frame-shaped in plan view, the Hall IC switch is fitted on a Hall IC switch supporting extension, extended approximately perpendicularly outward from an end portion closer to the frame member of an outer plate positioned adjacent to the permanent magnet.

2 Claims, 18 Drawing Sheets

BUCKLE DEVICE

TECHNICAL FIELD

The present invention relates to a buckle device provided with a buckle main body which releasably receives a tongue plate connected to webbing.

BACKGROUND ART

Conventionally, there have been proposed various types of buckle devices provided with a detection mechanism to detect the insertion of a tongue plate into a buckle main body.

For instance, a conventional buckle device is provided with a cover which is approximately rectangular tube-shaped, and open-ended at both lengthwise ends. An attachment piece is inserted from one side thereof, and then the cover is mounted on the buckle main body. Then wing portions of a switch is bent outward to widen the space therebetween, and placed outside the attachment piece. While maintaining this state, the switch is inserted inside the cover through a predetermined clearance formed on the other side of the cover. Thereby, such a buckle device is configured to be able to detect the insertion of the tongue plate into the buckle main body (see, for instance, Japanese Laid-open Patent Application Publication No. 2000-4909).

DISCLOSURE OF THE INVENTION

However, in the buckle device disclosed in Japanese Laid-open Patent Application Publication No. 2000-4909, the switch is inserted after the buckle main body is housed inside the cover through the clearance between the cover and the attachment piece. Therefore, there is a problem that complicated operations are required in the buckle assembly.

The present invention has been made in view of the above-described problem and an object thereof is to provide a buckle device capable of reliably detecting the engagement and disengagement between a tongue plate and a latch member and at the same time capable of improving the efficiency of assembly.

The buckle device of the present invention which achieves the above-described object comprises: a buckle device having a buckle main body configured to releasably receive a tongue plate connected to webbing, the buckle main body comprising: a frame member approximately U-shaped in side view, configured to house the tongue plate inserted therein; a slide button provided slidably on an outer surface on one side of the frame member; a base member approximately frame-shaped, fixedly provided on the frame member so as to be located above the slide button, the base member having an opening portion formed approximately in a center thereof; a latch member provided in the base member, movably in a direction perpendicular to the frame member, the latch member configured to be engaged with the tongue plate when the tongue plate is inserted, and to be disengaged with the tongue plate by slidingly moving the slide button; an ejector member provided in the frame member, movably in an insertion direction and a removal direction of the tongue plate, the ejector member configured to be moved when pushed by the tongue plate, and to be urged in the removal direction; a pair of long holes formed in parallel along a direction of movement of the ejector member, in the one side of the frame member facing the opening portion; a slider member approximately portal-shaped in front view, mounted on the ejector member through the pair of long holes, and configured to be moved within the opening portion integrally with the ejector member; a permanent magnet attached on one of two ends in a crosswise direction with respect to movement of the slider member; and a magnet position detection unit mounted on the base member, on an outer side of a magnet-side side wall which is located closer to the permanent magnet, the magnet position detection unit configured to detect a position of the permanent magnet in at least one of a state where the tongue plate and the latch member are engaged, and a state where the tongue plate is removed from the frame member.

In such a buckle device, the slider member with the permanent magnet attached thereon is mounted onto the ejector member which is moved inside the frame member when pressed by the tongue plate, through the pair of long holes. Accordingly, through detecting, by the magnet position detecting unit mounted on the outer side of the base member, a position of the permanent magnet attached on the slider member in at least one of a state where the tongue plate and the latch member are engaged and a state where the tongue plate is removed from the frame member, the disengagement between the tongue plate and the latch member can be reliably detected.

Further, the cover can be attached after mounting the magnet position detecting unit on the base member making up the buckle main body, on the outer side of the magnet-side side wall thereof facing the permanent magnet. Accordingly, the efficiency in assembly of the buckle device can be improved.

Further, in the buckle device according to the present invention, it is preferable that the magnet position detection unit comprises: a case formed in an approximately rectangular parallelepiped shape, approximately long-quadrangular in plan view, long in the direction of movement of the slider member; and first and second locking projections projecting from edge portions closer to the frame member on both lengthwise end faces of the case, respectively, to a predetermined height in the lengthwise direction of the case, wherein the base member comprises: a projection supporting frame approximately frame-shaped, erected outward to a predetermined height, in a position corresponding to the first locking projection on the magnet-side side wall, the projection supporting frame having a through hole formed therein into which the first locking projection is inserted and fitted; and an elastic engagement piece extended obliquely toward the second locking projection from an upper end portion of a wall face portion erected outward to a predetermined height across all width in a width direction of the magnet-side side wall, on a position corresponding to the second locking projection on the magnet-side side wall, the elastic engagement piece elastically deformable in an insertion direction of the magnet position detection unit, and wherein, the magnet position detection unit is mounted on the outer side of the magnet-side side wall through, while fitting the first locking projection into the projection supporting frame, pushing the second locking projection toward the elastic engagement piece so that the second locking projection is elastically engaged with the elastic engagement piece.

In such a buckle device, at the magnet position detection unit, while the first locking projection is fitted into the projection supporting frame provided on the base member, the second locking projection is pushed toward the elastic locking piece also provided on the base member, and thereby, the second locking projection is elastically locked with the elastic locking piece. As a result, the magnet position detection unit can be mounted onto the buckle main body with a single motion. Accordingly, the efficiency in assembly of the buckle device can be further improved.

Further, in the buckle device according to the present invention, the buckle main body further comprises a slide switch configured to be mounted on a position adjacent to an outer side of a slide-switch-side side wall opposite to the magnet-side side wall, the slide switch configured to make/break contact by moving a slide brush provided to face the slide-switch-side side wall, wherein the base member further comprises: a horizontally long notch portion notched to a predetermined height along a lengthwise direction of the slide-switch-side side wall on an edge portion closer to the frame member of the slide-switch-side side wall, wherein the slider member comprises: an engagement rib approximately L-shaped in side view, extended outward from an edge portion closer to the frame member on other of the two ends in a crosswise direction with respect to the movement of the slider member, configured to be inserted into the horizontally long notch portion, and further extended approximately vertically along an outer wall face of the slide-switch-side side wall, wherein the slide brush comprises: a pair of projecting pieces projecting at a back side facing the slide-switch-side side wall, with a predetermined space therebetween along a slide direction of the slide brush, and wherein, when the slide switch is mounted adjacent to the outer side of the slide-switch-side side wall and the engagement rib is positioned between the pair of projecting pieces, the slide switch is configured to: make/break contact in accordance with the position of the slide brush configured to be slidingly moved along with the movement of the slider member as the engagement rib abuts on the pair of projecting pieces, and detect at least one of a state where the tongue plate and the latch member are engaged and a state where the tongue plate is removed from the frame member.

In such a buckle device, when the slide switch is mounted on a position in proximity to the outer side of the slide-switch-side side wall of the base member, the engagement rib provided for the slider member is positioned between the pair of projecting pieces projecting at the back side of the slide brush with a predetermined space therebetween. The slide switch makes or breaks contact in accordance with the position of the slide brush which is configured to be slidingly moved with the movement of the slider member as the engagement rib abuts on the pair of projecting pieces. Thereby, there can be detected at least one of the states where the tongue plate and the latch member are engaged and where the tongue plate is removed from the frame member.

Thereby, through detecting by the slide switch at least one of the state where the tongue plate and the latch member are engaged and the state where the tongue plate is removed from the frame member, the engagement and disengagement between the tongue plate and the latch member can be more reliably detected. In addition, even if either the magnet position detection unit or the slide switch malfunctions, the engagement and disengagement between the tongue plate and the latch member can be reliably detected. Accordingly, the reliability thereof can be improved.

Further, a cover can be mounted after mounting the magnet position detection unit and the slide switch onto the base member making up the buckle main body. Accordingly, the efficiency in assembly of the buckle device can be improved.

BEST MODES FOR CARRYING OUT THE INVENTION

Hereinafter, one embodiment of the buckle device according to the present invention will be described in detail while referring to the accompanying drawings.

[Schematic Configuration]

Figure 1:
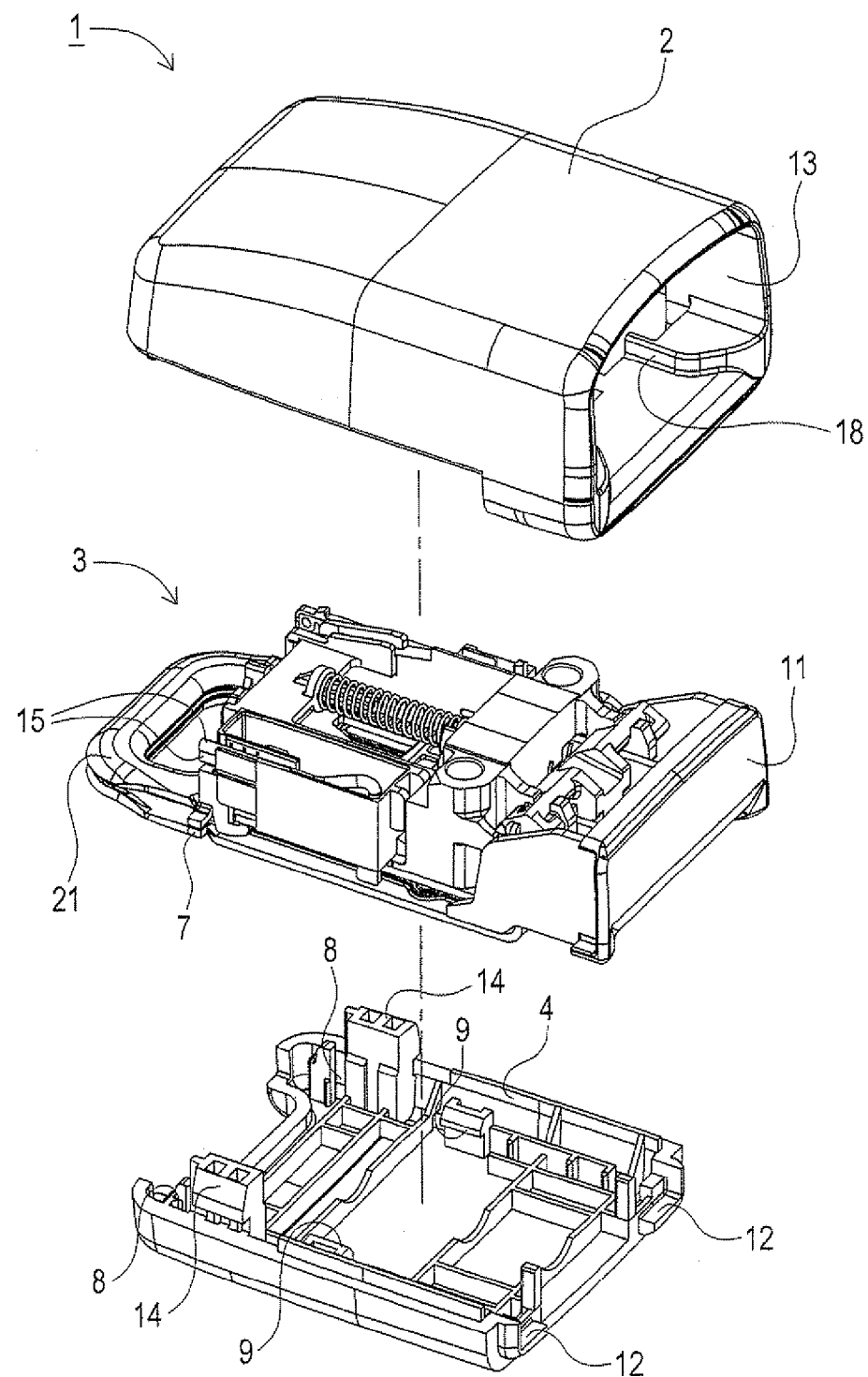
FIG. 1 is a perspective view of a buckle device according to the present embodiment in a state where upper and lower covers are disassembled.
Figure 2:
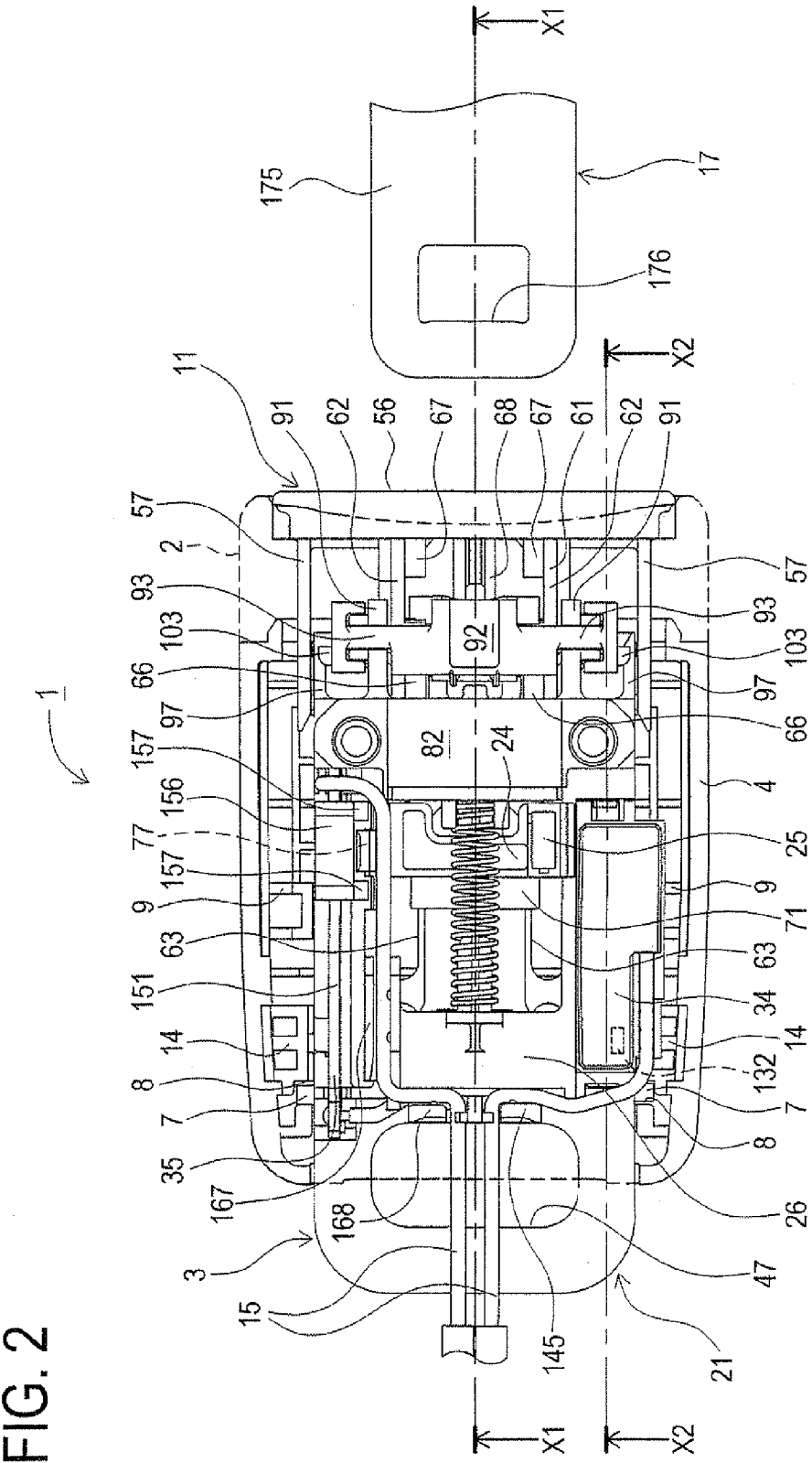
FIG. 2 is a plan view of the buckle device in a state where the upper cover is removed.
Figure 3:
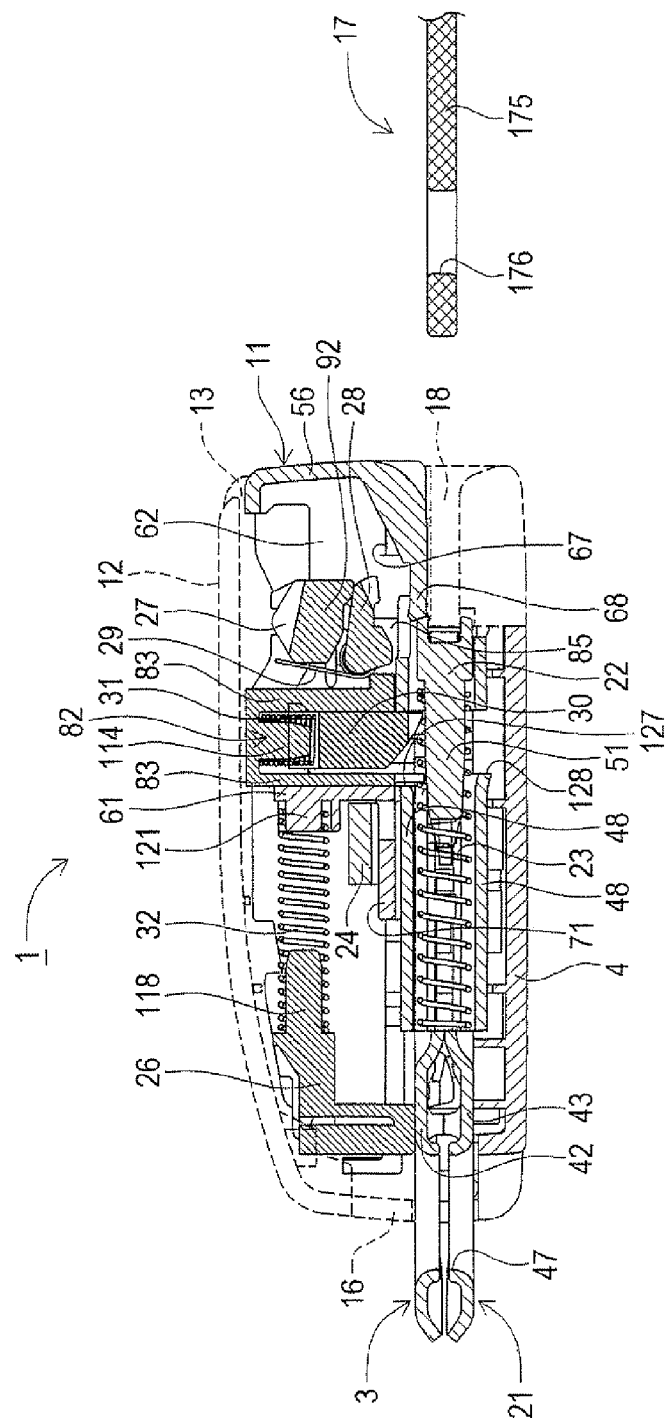
FIG. 3 is a cross sectional view along line X1-X1 in FIG. 2.

First, a schematic configuration of a buckle device 1 according to the present embodiment will be described based on FIGS. 1 through 3. FIG. 1 is a perspective view of the buckle device 1 according to the present embodiment in a state where upper and lower covers 2 and 4 are disassembled. FIG. 2 is a plan view of the buckle device 1 in a state where the upper cover 2 is removed. FIG. 3 is a cross sectional view along line X1-X1 in FIG. 2.

As shown in FIG. 1, the buckle device 1 is configured to have the upper cover 2 made of synthetic resin, a buckle main body 3, and the lower cover 4 made of synthetic resin.

As shown in FIGS. 1 through 3, the buckle main body 3 can be assembled onto the lower cover 4, through fitting and pressing protruding portions 7, which are protruding from both side-faces of a frame member 21, into positioning grooves 8 of the lower cover 4 respectively. As a result, the buckle main body 3 is secured onto the lower cover 4, as the both side-faces of the frame member 21 are locked with locking portions 9 respectively, each of which is approximately triangular-shaped in cross section, projecting inward in the width direction from each inner side-face of the lower cover 4.

Then, while a slide button 11 of the buckle main body 3 and projecting portions 12 of the lower cover 4 are inserted inside an opening 13 of the upper cover 2, the lower cover 4 is pressed onto the lower side of the upper cover 2. Each of the projecting portions 12 is L-shaped in front view formed at each corner of an end portion closer to the slide button 11, on a side of the lower cover 4. By the above operation, locking pawls 14 of the lower cover 4, which are approximately triangular-shaped in cross section, are engaged inside the upper cover 2, and thus the lower cover 4 is mounted onto the upper cover 2. In addition, a slit hole 16 through which lead wires 15 are drawn out is formed in the other end portion in a lengthwise opposite direction with respect to the opening 13.

Further, a stepped portion 18 is formed in the opening 13 under the slide button 11, to receive a tongue plate 17 therein. The stepped portion 18 is formed to be narrower as going deeper in a depth direction so that an insertion tip of the tongue plate 17 can be guided into approximately the width center with respect to the frame member 21.

Figure 4:
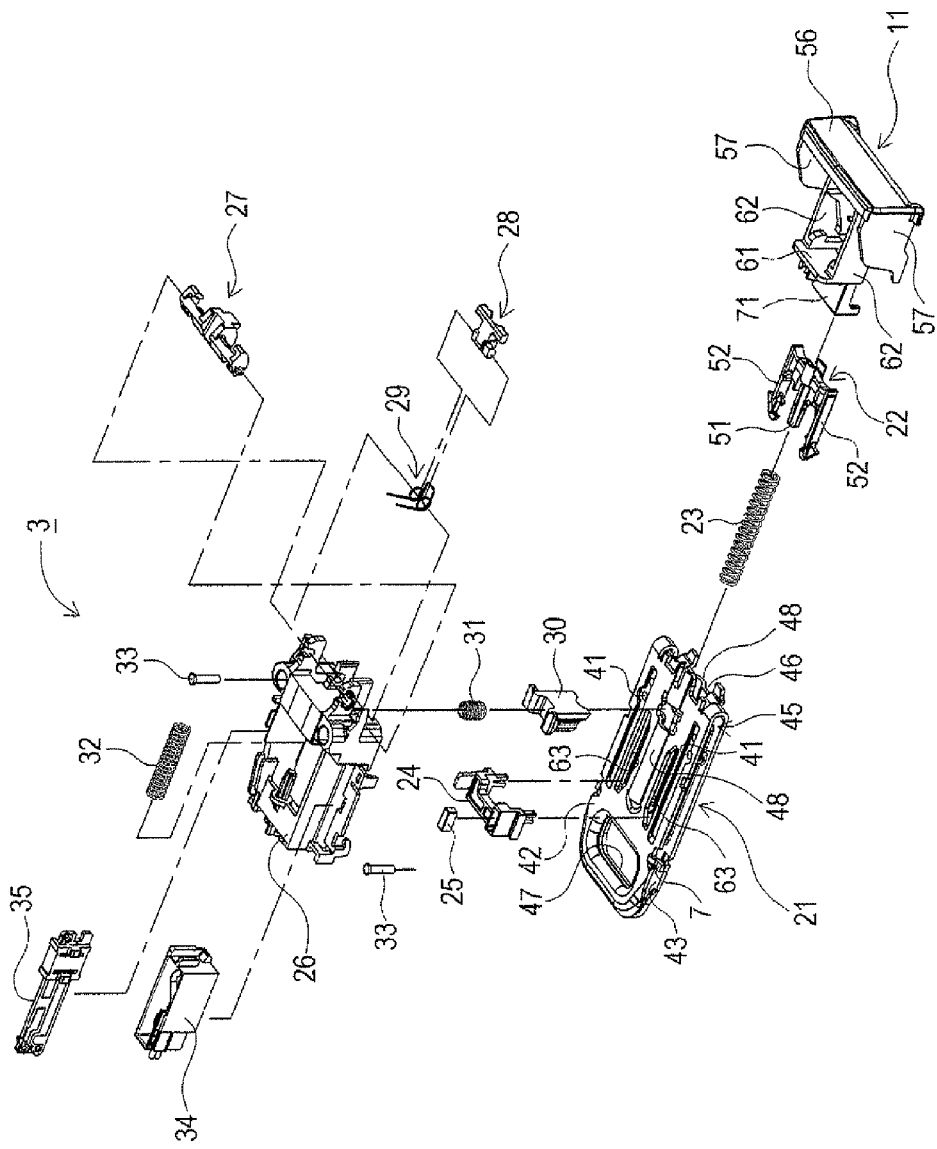
FIG. 4 is an exploded perspective view of a buckle main body.

Next, a schematic configuration of the buckle main body 3 will be described based on FIGS. 2 through 12. First, members making up the buckle main body 3 are described based on FIG. 4. FIG. 4 is an exploded perspective view of the buckle main body 3.

As shown in FIG. 4, the buckle main body 3 is configured to have the frame member 21 made of metal such as steel, an ejector 22 made of synthetic resin, an ejector spring 23, the slide button 11 made of synthetic resin, a slider member 24 made of synthetic resin, a permanent magnet 25, a base member 26 made of synthetic resin, a stopper member 27 made of metal such as aluminum, a lever member 28 made of metal such as aluminum, a torsion spring 29, a latch 30 made of metal such as steel, a latch spring 31, a button spring 32, a pair of rivets 33 for securing the base member 26 on the frame member 21 to be later described, a Hall IC switch 34 and a mechanical switch 35.

[Frame Member]

Figure 5:
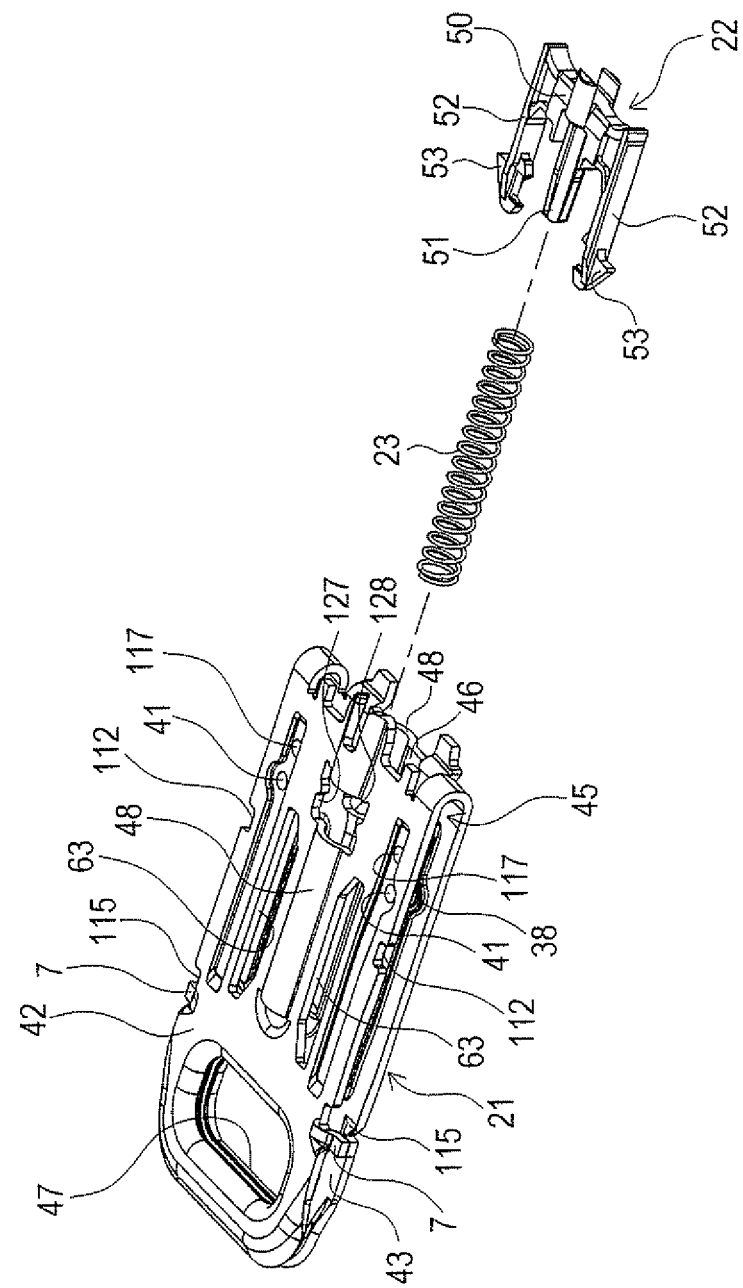
FIG. 5 is an explanatory view depicting mounting of an ejector onto a frame member.

Next, the frame member 21 will be described based on FIGS. 3 through 5. FIG. 5 is an explanatory view depicting mounting of the ejector 22 onto the frame member 21.

As shown in FIGS. 3 through 5, the frame member 21 is formed by bending a plate material such as a steel plate at the lengthwise center thereof into an approximately U-shape. At each widthwise end portion of the frame member 21, a pair of flanged holes 38 is formed in a manner to protrude inside. A rivet 41 is inserted through and calked with each pair of flanged holes 38. Thereby, between an upper plate 42 facing the upper cover 2 and a lower plate 43 facing the lower cover 4 is formed an insertion portion 45 which is twice as high as the height of a flanged hole 38.

The frame member 21 bent into the U-shape has an insertion hole 46, which is slit-like, long along the widthwise direction with respect to the frame member 21, and formed at the curve-bottom thereof, that is, at an end portion of the frame member 21 on a side closer to the opening 13. The frame member 21 also has an opening 47 in an approximately quadrangular shape formed at the top ends of the curve thereof, that is, at an end portion of the frame member 21 on a side lengthwise opposite to the insertion hole 46, in a manner passing through and linking the upper plate 42 and the lower plate 43. One end of webbing or a wire is passed through and attached to the opening 47. The other end of the webbing or the wire is secured to a vehicle.

[Ejector and Ejector Spring]

Inside the frame member 21, the ejector spring 23 is inserted from the lengthwise center position of the insertion hole 46. The ejector spring 23 is inserted elastically between bulging portions 48, which locate parallel with each other and are formed in the widthwise centers in the upper plate 42 and the lower plate 43, respectively, to bulge, along a lengthwise direction, outward in an arc shape in cross section.

The ejector 22 is also inserted from the insertion hole 46 along the lengthwise direction, inside the frame member 21 in a slidable manner. The ejector 22 has a main body portion 50 and a rod 51. The rod 51 is formed in a standing manner at the center in the width direction of the main body portion 50, and configured to be inserted into one end of the ejector spring 23 and be urged toward the insertion hole 46. The ejector 22 also has a pair of elastic locking pieces 52 elastically-deformable inward, at both widthwise ends of the main body portion 50. The pair of elastic locking pieces 52 is extended in parallel with the rod 51, in other words, extended toward the slit hole 16 of the upper cover 2.

Each of the elastic locking pieces 52 has a length sufficient to reach the pair of flanged holes 38 when the main body portion 50 is inserted thoroughly from the insertion hole 46 into the insertion portion 45. Each elastic locking piece 52 has a locking projection 53 in proximity to the tip thereof. The locking projection 53 is shaped right-triangular in plan view and projecting widthwise outward. Accordingly, through inserting the ejector 22 from the insertion hole 46 against the resilience of the ejector spring 23, each locking projection 53 is caught by each pair of flanged holes 38. Thereby, the ejector 22 and the ejector spring 23 are mounted inside the frame member 21, making it possible to control the slide length of the ejector 22 within a certain range (see FIG. 6).

[Slide Button]

Figure 6:
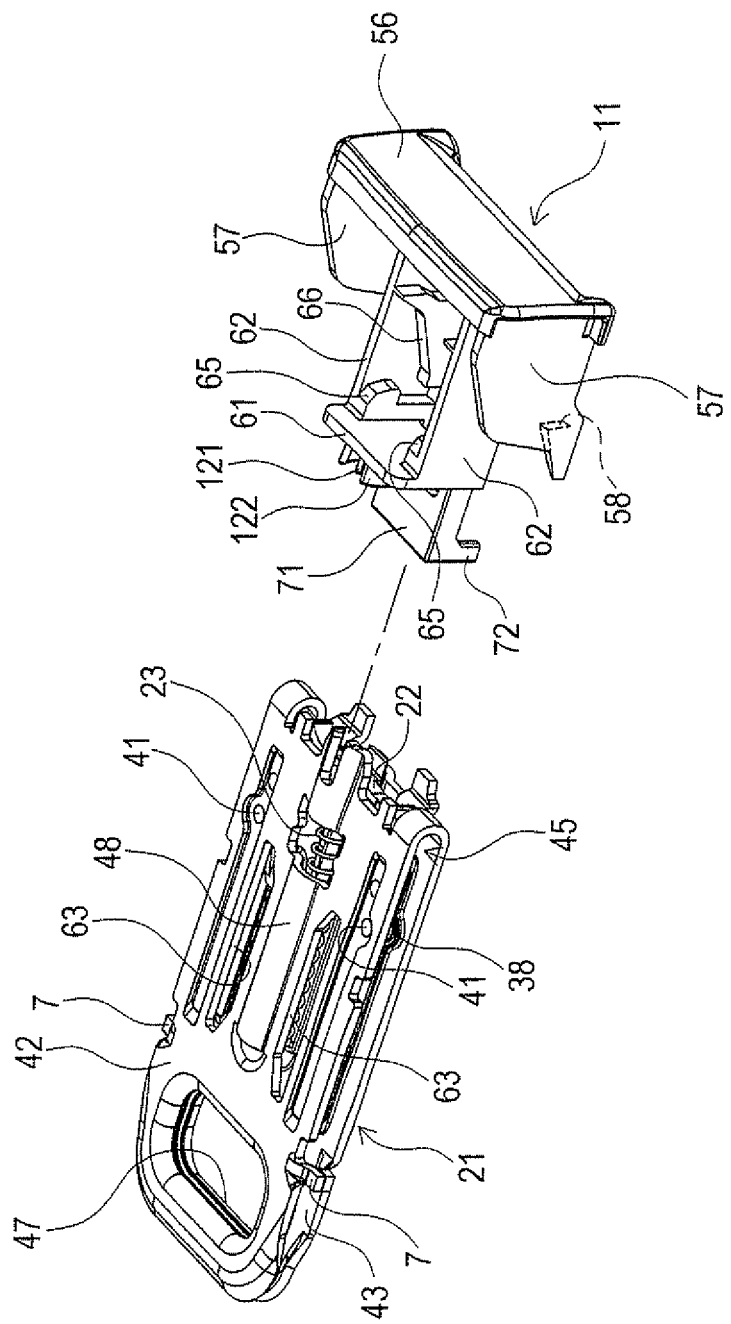
FIG. 6 is an explanatory view depicting mounting of a slide button onto the frame member.

Next, the slide button 11 will be described based on FIGS. 2 through 4, and FIG. 6. FIG. 6 is an explanatory view depicting mounting of the slide button 11 onto the frame member 21.

As shown in FIGS. 2 through 4 and FIG. 6, the slide button 11 disposed on the upper plate 42 of the frame member 21 is provided with an operation portion 56, which is in a horizontally-long quadrangular plate shape. A pressing surface of the operation portion 56 is facing the opening 13 and configured to be pressed so as to make the slide button 11 slidingly move toward the slit hole 16.

A pair of side plates 57 is extended in parallel with each other from both lengthwise ends of the back opposite to the pressing surface of the operation portion 56 (i.e., both ends in upper and lower directions in FIG. 2). The side plates 57 are each formed approximately quadrangular plate-shaped, whose thickness direction is defined along the widthwise direction with respect to the frame member 21, and installed to hold the upper plate 42 therebetween, widthwise with respect to the frame member 21.

The side plates 57 have pawl pieces 58 formed protruding inward at corners facing the upper plate 42 respectively, at end portions in the direction of the extension of the side plates 57. The pawl pieces 58 are provided in a manner engageable from outside the frame member 21 between the upper plate 42 and the lower plate 43 of the frame member 21. In an engaged state, the pawl pieces 58 prevent the removal of the slide button 11 from the frame member 21, and at the same time allow the slide button 11 to slide lengthwise with respect to the frame member 21.

Inside the side plates 57 is formed a latch supporting frame 61, which is rectangular frame shaped in plan view, long in a direction of the slide of the slide button 11. The latch supporting frame 61 has side walls 62 that are widthwise opposite to each other, with respect to the frame member 21. The side walls 62 are extended in parallel with each other from the back portion on the flip side of the pressing surface of the operation portion 56. The side walls 62 are each formed into a plate, whose thickness direction is defined along the width direction with respect to the frame member 21, and are disposed with spacing at positions corresponding to a pair of long holes 63, respectively. The pair of long holes 63 is formed in the upper plate 42 of the frame member 21, in lengthwise parallel with each other, with the bulging portions 48 disposed therebetween.

On the inner surface of each side wall 62 is formed a stopper 65, in an end portion in a direction of extension of each side wall 62. Further, each side wall 62 has, on the inner surface thereof, a button slope 66 formed at a position closer to the operation portion 56 than the stopper 65. The button slope 66 is an inclined plane, at an angle and facing opposite to the operation portion 56, i.e., facing opposite to the frame member 21 with respect to the opening 47. The plane facing opposite to the frame member 21 is formed gradually away from the frame member 21 and closer to the operation portion 56.

As illustrated in FIGS. 2 and 3, on the inner surface of each side wall 62 is also provided an abutment portion 67, on a base end portion closer to the operation portion 56 at a corner closer to the frame member 21. Each abutment portion 67 protrudes at a predetermined height from the back portion of the operation portion 56 toward the button slope 66, and is square-shaped in cross section. As will be described later, each abutment portion 67 is configured to abut on the lever member 28 when the lever member 28, which is pivotally supported in a rotatable manner at the base member 26, is turned toward the frame member 21 (see FIG. 24), and also configured to move below the lever member 28 when the lever member 28 is turned away from the frame member 21 (see FIG. 22).

In the center portion between the side walls 62 is formed an elongated piece 68, which is extended by a predetermined length from an end portion closer to the frame member 21 of the operation portion 56. The elongated piece 68 is configured to be inserted inside the bulging portion 48 of the upper plate 42 from the insertion hole 46 of the frame member 21 so as to abut on an end portion closer to the upper plate 42 of the ejector 22.

As illustrated in FIGS. 2 and 6, a side wall opposite to the operation portion 56 of the latch supporting frame 61 is provided with an extending portion 71, extended, from an end portion closer to the frame member 21 of the side wall, with a width approximately equal to the width of an area between the pair of long holes 63 formed in the upper plate 42. In addition, the extending portion 71 has a pair of leg portions 72, formed on both widthwise ends at an end portion in a direction of extension of the extending portion 71, and protruding toward the frame member 21. The pair of leg portions 72 is formed to interpose, therebetween, the area which is located between the pair of long holes 63 formed in the upper plate 42, and to pass through the pair of long holes 63, respectively, so that the pair of leg portions 72 is positioned between the upper plate 42 and the lower plate 43.

Then, as illustrated in FIG. 6, the pair of leg portions 72 of the slide button 11 is inserted into the pair of long holes 63 of the frame member 21 on which the ejector spring 23 and the ejector 22 are mounted, respectively. The pawl pieces 58 formed on the side plates 57 of the slide button 11 are engaged, from the outside of the frame member 21, between the upper plate 42 and the lower plate 43 of the frame member 21. Thereby, the slide button 11 is mounted irremovably from the frame member 21, and also slidable on the upper plate 42 in the lengthwise direction with respect to the frame member 21 (see FIG. 7). The elongated piece 68 of the slide button 11 abuts on the end portion closer to the upper plate 42 of the ejector 22 (see FIG. 3).

[Slider Member]

Figure 7:
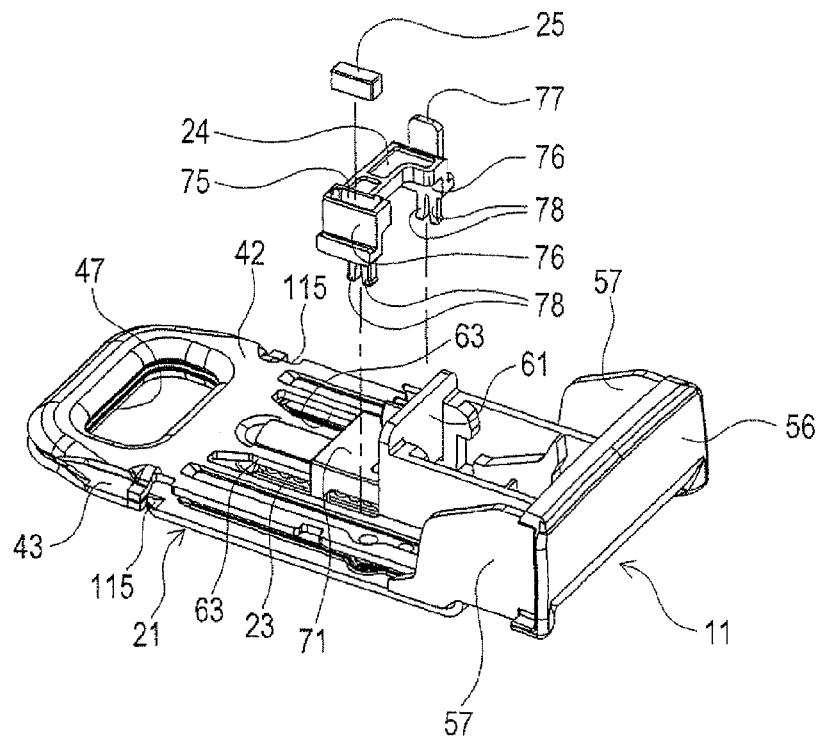
FIG. 7 is an explanatory view depicting mounting of a slider member onto the frame member.
Figure 8:
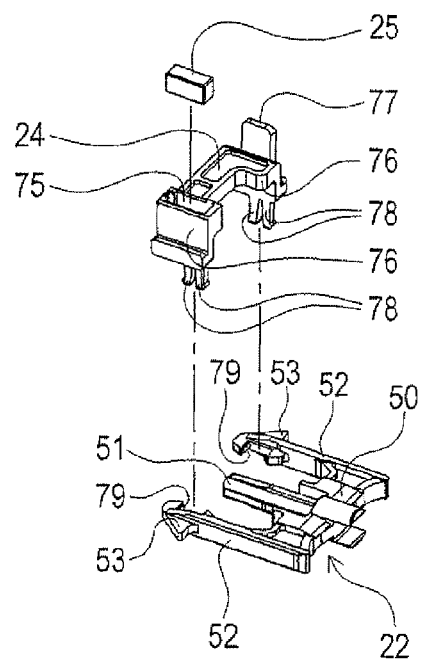
FIG. 8 is an explanatory view depicting locking of the slider member with the ejector in FIG. 7.

Next, a slider member 24 will be described based on FIGS. 2 through 4, 7 and 8. FIG. 7 is an explanatory view depicting mounting of the slider member 24 onto the frame member 21. FIG. 8 is an explanatory view depicting locking of the slider member 24 with the ejector 22 mounted inside the frame member 21 in FIG. 7.

As illustrated in FIGS. 2 through 4 and FIG. 7, the slider member 24 is formed in an approximately portal shape in front view, to cross over the extending portion 71 of the slide button 11. The thickness of the slider member 24 with respect to the lengthwise direction of the frame member 21 is smaller than the length of the extending portion 71 in the above lengthwise direction. A concave portion 75 of a predetermined depth is formed on the upper surface of the slider member 24, in one end portion with respect to the widthwise direction of the frame member 21 (i.e., the end portion on lower side in FIG. 2, or the end portion facing the Hall IC switch 34). The permanent magnet 25 in an approximately rectangular parallelepiped shape is inserted and fixed inside the concave portion 75 with adhesives, etc. The permanent magnet 25 may also be fixed inside the concave portion 75 through deforming an opening end portion of the concave portion 75 inward by melting and the like, after inserting the permanent magnet 25 inside the concave portion 75.

Leg portions 76 on both widthwise sides of the slider member 24 are formed to be a little longer than the height from the upper surface of the upper plate 42 of the frame member 21 to the upper surface of the extending portion 71, so that a predetermined clearance is formed between the slider member 24 and the extending portion 71. The permanent magnet 25 of the slider member 24 is mounted on the top of one of the leg portions 76, and the other of the leg portions 76 located on the opposite side of the one of the leg portions 76 is provided with an engagement rib 77 which is L-shaped in cross section, extended outward by a predetermined length, and also extended upward, from an end portion closer to the upper plate 42 of the frame member 21.

On the end faces of the leg portions 76 closer to the upper plate 42 is provided a pair of elastic engagement pieces 78, respectively, each of which is elastically-deformable inward, in a manner aligned along the lengthwise direction of the frame member 21. On the tip of each elastic engagement piece 78 is formed an engagement projection projecting outward along the lengthwise direction of the frame member 21.

Meanwhile, as illustrated in FIG. 8, inside the tip of each elastic locking piece 52 of the ejector 22 is formed an engagement portion 79, which is U-shaped in plan view and inwardly-open, as illustrated in FIG. 8. The engagement portion 79 provided at the tip of each elastic locking piece 52 of the ejector 22 is configured to move along each long hole 63, when the ejector 22 is mounted inside the frame member 21.

Accordingly, as illustrated in FIGS. 7 and 8, each pair of elastic engagement pieces 78 of the slider member 24 with the permanent magnet 25 mounted thereon is inserted through each long hole 63 of the frame member 21 so that the slider member 24 crosses over the extending portion 71 and is engaged with each engagement portion 79 provided at the tip of each elastic locking piece 52 of the ejector 22. Thereby, the slider member 24, in which the permanent magnet 25 is fixed on one end portion and the engagement rib 77 is formed on the other end portion with respect to the widthwise direction of the frame member 21, is mounted irremovably from the frame member 21 and also slidably with respect to the lengthwise direction of the frame member 21, on the upper plate 42 integrally with the ejector 22 (see FIG. 11).

[Base Member]

Figure 9:
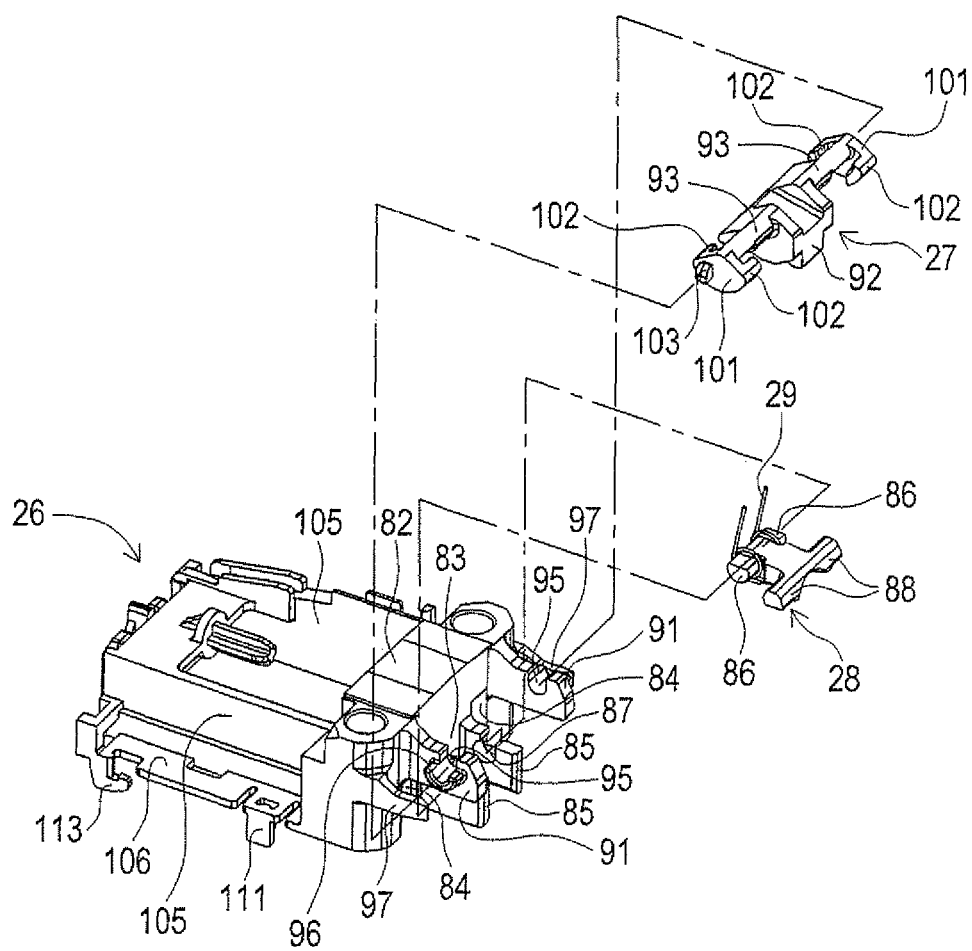
FIG. 9 is an explanatory view depicting assembly of a stopper member and a lever member to a base member.
Figure 10:
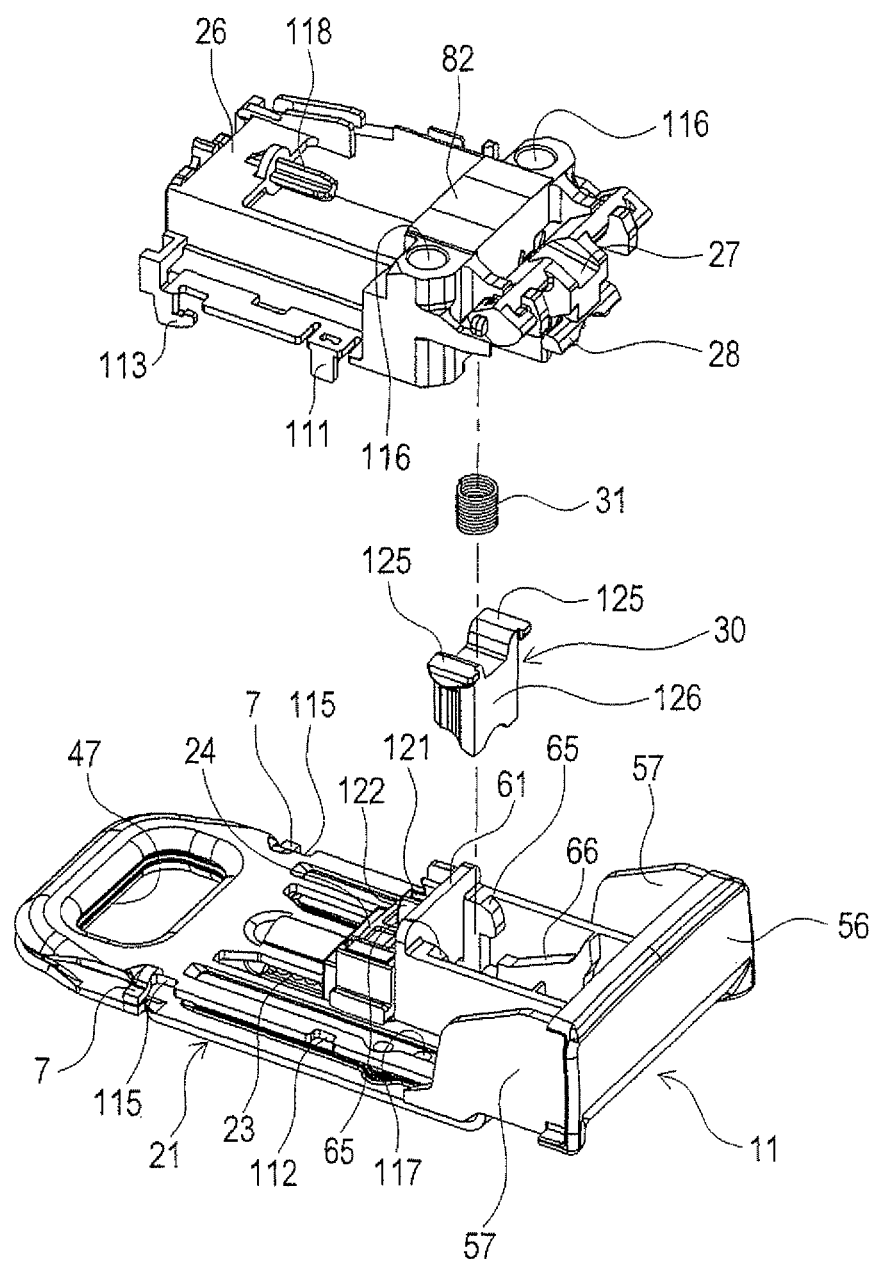
FIG. 10 is an explanatory view depicting assembly of the base member and a latch to the frame member.
Figure 11:
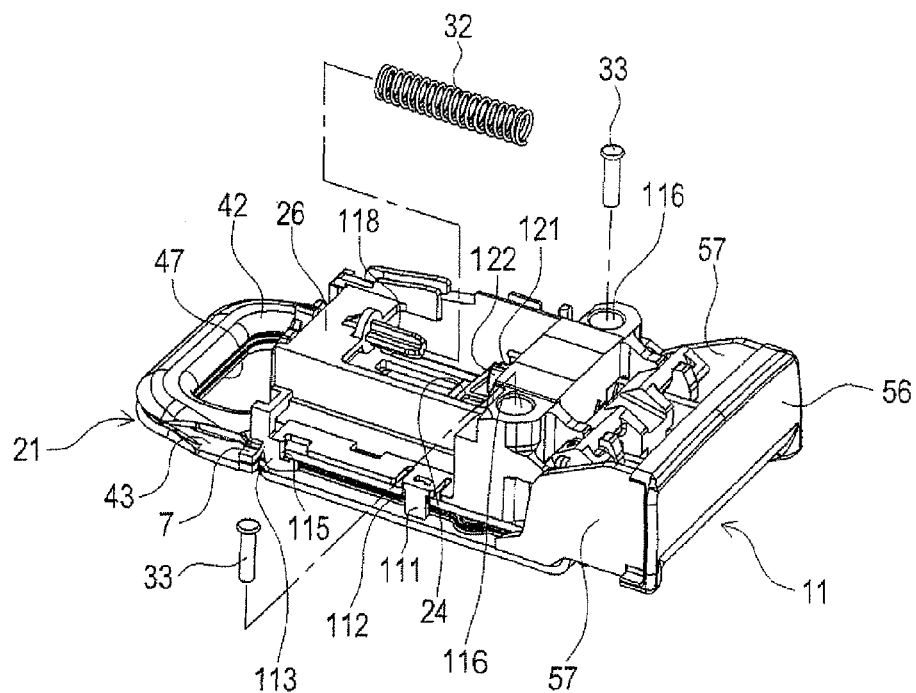
FIG. 11 is an explanatory view depicting fixation of the base member to the frame member.
Figure 13:
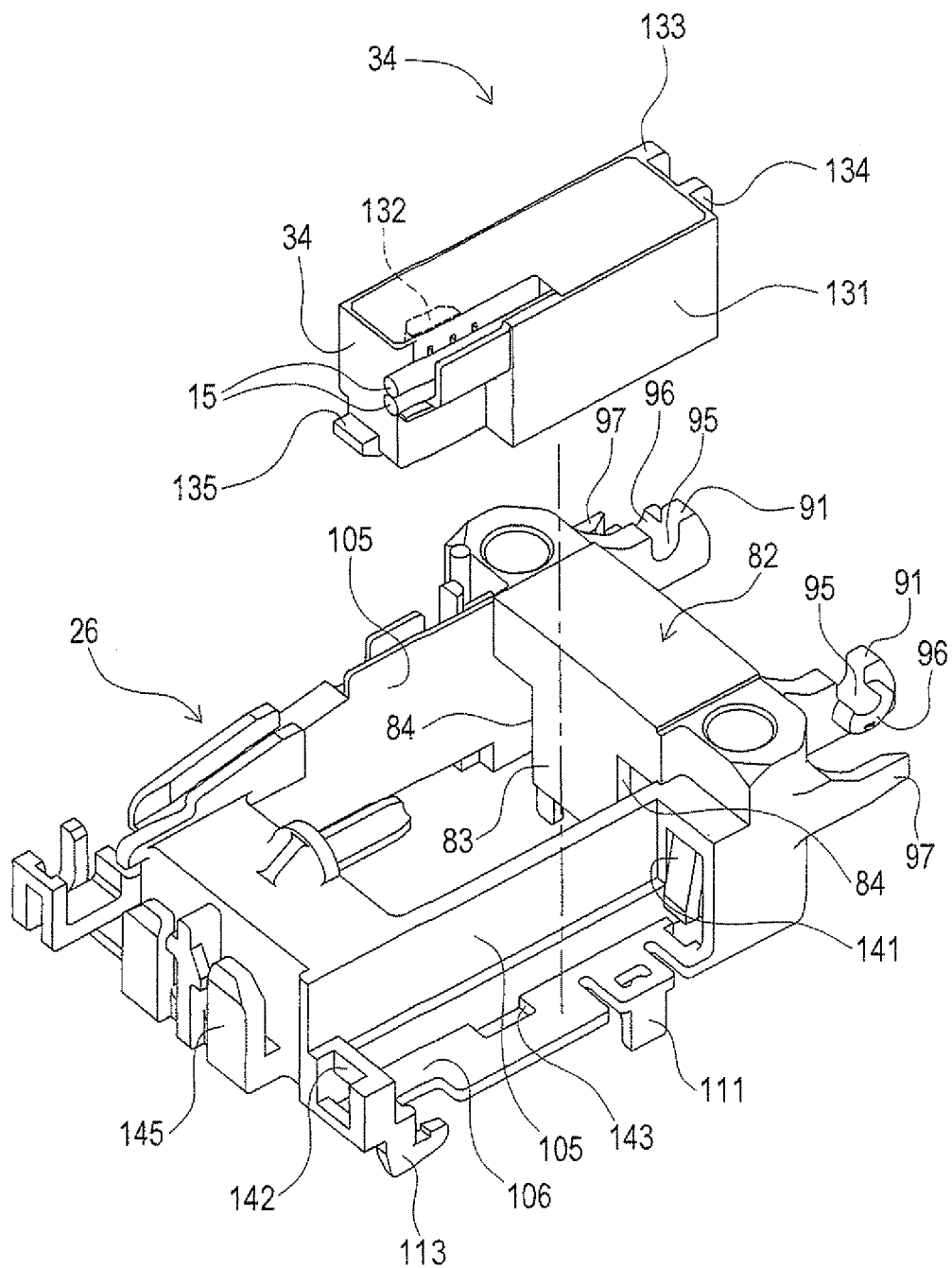
FIG. 13 is an enlarged view of part of the base member where a Hall IC switch is to be mounted.
Figure 19:
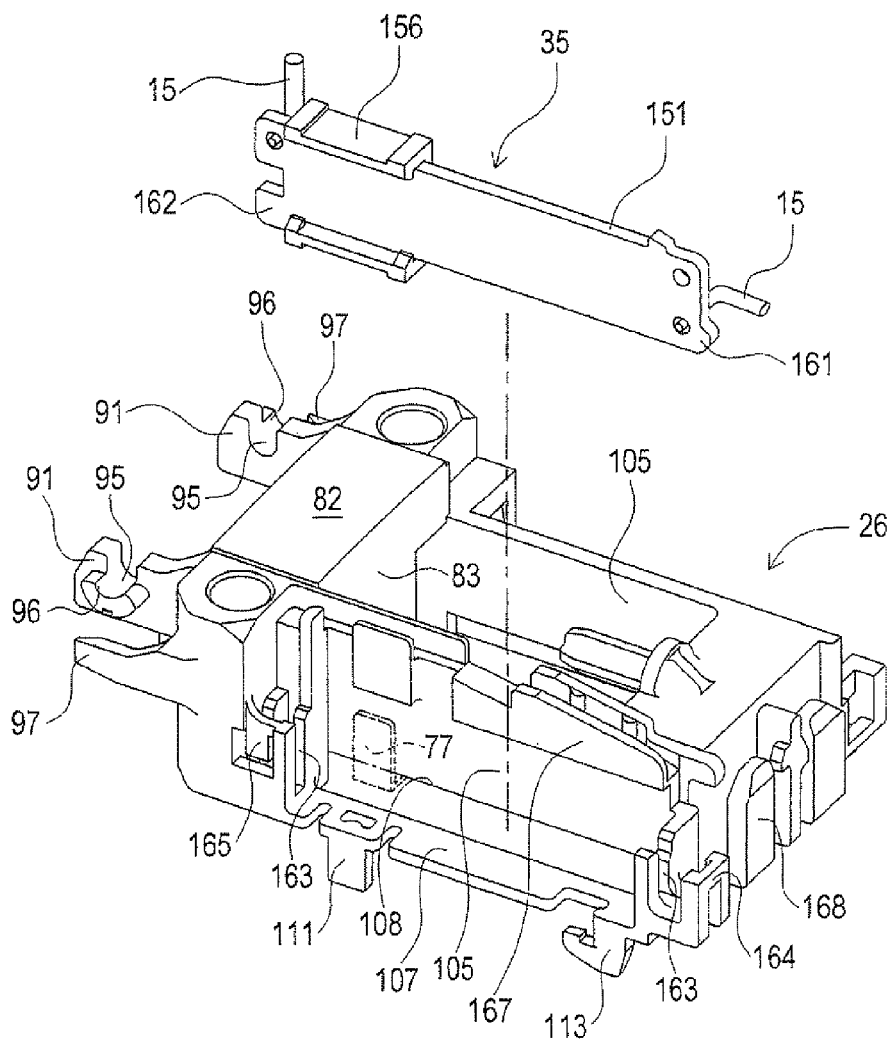
FIG. 19 is an enlarged view of part of the base member where a mechanical switch is to be mounted.

Next, the base member 26 will be described based on FIGS. 2 through 4, 9 through 11, 13, and 19. FIG. 9 is an explanatory view depicting assembly of the stopper member 27 and the lever member 28 to the base member 26. FIG. 10 is an explanatory view depicting assembly of the base member 26 and the latch 30 to the frame member 21. FIG. 11 is an explanatory view depicting fixation of the base member 26 to the frame member 21. FIG. 13 is an enlarged view of part of the base member 26 where the Hall IC switch 34 is to be mounted. FIG. 19 is an enlarged view of part of the base member 26 where the mechanical switch 35 is to be mounted.

As illustrated in FIGS. 2 through 4, 9 and 13, the base member 26 is formed into an approximately rectangular frame shape in plan view to cover the almost entire surface of the upper plate 42 of the frame member 21. The width of the base member 26 with respect to the widthwise direction of the frame member 21 is formed to be smaller than a spacing of the side plates 57 of the slide button 11. The base member 26 has a latch housing portion 82, which opens in a direction of the frame member 21, on an end portion closer to the slide button 11.

The latch housing portion 82 has a pair of retention plates 83 configured to be inserted to the inner side of the latch supporting frame 61 of the slide button 11, and crossing the slide direction of the slide button 11. The latch 30 is positioned between the pair of retention plates 83. In both widthwise sides of the pair of retention plates 83, widthwise with respect to the frame member 21, is provided a pair of insertion grooves 84, respectively. The pair of insertion grooves 84 is aligned parallel with each other and into which the side walls 62 of the latch supporting frame 61 of the slide button 11 are inserted from a side closer to the frame member 21, respectively.

In the base member 26, a pair of lever supporting pieces 85 is provided on one of the retention plates 83 which is positioned on a side facing the operation portion 56 of the slide button 11. The pair of lever supporting pieces 85 is extended toward the operation portion 56, in parallel with each other, from both widthwise end portions of the one of the retention plates 83, widthwise with respect to the frame member 21. The pair of lever supporting pieces 85 is each formed approximately into a plate shape whose thickness direction is defined along the widthwise direction with respect to the frame member 21, and faces each other in the widthwise direction with respect to the frame member 21.

A pair of shaft supporting grooves 87 is formed on the pair of lever supporting pieces 85, respectively. Each of the pair of shaft supporting grooves 87 is approximately circular shaped in cross section, formed by cutting off a portion on the upper end of the lever supporting piece 85. Into the pair of shaft supporting grooves 87 is rotatably inserted a pair of lever rotating shafts 86, respectively, which are projected on both sides widthwise outward, widthwise with respect to the frame member 21, from the lever member 28, on an end portion thereof closer to the base member 26, respectively. Each lever rotating shaft 86 of the lever member 28 is formed in an approximately semicircular shape in cross section.

On the other end portion of the lever member 28, which is closer to the operation portion 56 of the slide button 11, is formed a pair of projecting pieces 88 projecting on both sides widthwise outward, with respect to the frame member 21. Accordingly, if the lever member 28 is positioned parallel with the upper plate 42, each lever supporting piece 85 has a predetermined clearance from each projecting piece 88 formed at an end portion closer to the operation portion 56 of the slide button 11 (see FIG. 3).

Accordingly, as illustrated in FIG. 9, the torsion spring 29 is mounted onto the pair of lever rotating shafts 86 so that the free ends of the torsion spring 29 are arranged facing upward and then the pair of lever rotating shafts 86 is inserted through the cut-off portions into the shaft supporting grooves 87 formed in the lever supporting pieces 85, respectively, and thereby the lever member 28 is made supported rotatably toward the frame member 21. When inserted through each cut-off portion, a straight line portion of the approximately semicircular shape in cross section of each of the pair of lever rotating shafts 86 is set vertical, in other words, the lever member 28 is set approximately perpendicular with respect to the upper plate 42, and then each of the pair of lever rotating shafts 86 is inserted through each cut-off portion. Each of the pair of projecting pieces 88 of the lever member 28 is configured to face an end surface closer to the base member 26 of each abutment portion 67 of the slide button 11 when the lever member 28 is rotated toward the frame member 21 (see FIG. 24).

As illustrated in FIG. 9, both widthwise outer peripheries, widthwise with respect to the frame member 21, on the parallel pair of insertion grooves 84 of the base member 26 are provided with a pair of stopper supporting pieces 91, respectively. The pair of stopper supporting pieces 91 is extended in parallel with each other toward the operation portion 56 of the slide button 11 from a position higher than the pair of lever supporting pieces 85. The pair of stopper supporting pieces 91 is each formed into an approximately plate-like shape, whose thickness direction is defined along the widthwise direction with respect to the frame member 21, and placed widthwise opposite with each other, with respect to the frame member 21.

The pair of stopper supporting pieces 91 has a pair of shaft supporting grooves 95, respectively, each of which is semicircular in cross section and opens at an upper side thereof. A pair of stopper rotating shafts 93 is fitted into the pair of shaft supporting grooves 95 in a rotatable manner, respectively. The pair of stopper rotating shafts 93 is projecting on both sides widthwise outward with respect to the frame member 21, from an upper end portion of an inertial mass body 92, which is approximately hexagonal shaped in cross section, of the stopper member 27 (see FIGS. 13 and 19). In peripheries on both sides widthwise outward with respect to the frame member 21 of the pair of shaft supporting grooves 95 is formed a pair of slide guide portions 96, respectively, each of which is circular-arc shaped in cross section, projecting widthwise outward from each periphery (see FIGS. 13 and 19).

The base member 26 has, at both widthwise end portions thereof with respect to the frame member 21, a pair of rotation restricting pieces 97 which is projecting toward the operation portion 56 of the slide button 11 in a manner facing the pair of stopper supporting pieces 91, respectively (see FIGS. 13 and 19). Each of the pair of rotation restricting pieces 97 is formed into an approximately elongated-plate shape whose thickness direction is defined along the widthwise direction of the frame member 21, and provided in a standing manner so that a tip thereof faces a lowermost end of each of the pair of slide guide portions 96.

Meanwhile, a pair of extending portions 101 is provided on the axially outer ends of the pair of stopper rotating shafts 93 of the stopper member 27, respectively. Each of the pair of extending portions 101 is extended radially outward in an approximately fan-like plate shape, in a manner facing the inertial mass body 92 and also facing an outer side of a slide guide portion 96 of a stopper supporting piece 91. Each extending portion 101 has a pair of slide portions 102 at two opposite circumferential end portions on the inner surface thereof. The pair of slide portions 102 is extended in a manner facing the outer circumference of a slide guide portion 96. Further, each extending portion 101 also has a projection 103, at an end portion closer to the base member 26 on the axially outer surface thereof. Each projection 103 is formed in a standing manner and configured to abut on the upper end face of each rotation restricting piece 97.

Accordingly, as illustrated in FIG. 9, the stopper member 27 is mounted by fitting the stopper rotating shafts 93 into the shaft supporting grooves 95 of the stopper supporting pieces 91 respectively, and at the same time slidably attaching the pairs of slide portions 102, which are provided at both outer ends of the stopper rotating shafts 93, on the outer circumferences of the slide guide portions 96 of the stopper supporting pieces 91, respectively. The free ends of the torsion spring 29 mounted on the lever member 28 are positioned to abut on a side which is closer to the base member 26 on the end face of the inertial mass body 92 (see FIGS. 3 and 10). As a result, the stopper rotating shafts 93 are prevented from coming off from the shaft supporting grooves 95 by the slide portions 102 and the slide guide portions 96.

Accordingly, the torsion spring 29 rotates the lever member 28 in a direction away from the frame member 21, and then the lever member 28 rotates the end portion on the side closer to the operation portion 56 of the slide button 11 of the inertial mass body 92 abutting on the upper surface of the lever member 28, in a direction away from the frame member 21. Meanwhile, the stopper member 27 is rotated in such a direction that the inertial mass body 92 moves away from the frame member 21, and each of the pair of projections 103 provided on both widthwise ends with respect to the frame member 21 abuts on the upper surface of each rotation restricting piece 97.

Thereby, as illustrated in FIGS. 3 and 10, the lever member 28 is kept in a state approximately parallel with the upper plate 42 of the frame member 21, and also, the upper surface of the lever member 28 is kept in a state having contact with an end portion projecting in an approximately V-shape in cross section, on a side of the inertial mass body 92 of the stopper member 27 closer to the operation portion 56 of the slide button 11. The gravity center of the inertial mass body 92 is set displaced from the axial center of the stopper rotating shafts 93 toward the frame member 21, so that, as will be described later, when the inertial mass body 92 receives an inertial force in a direction opposite to the opening 13 in the lengthwise direction with respect to the frame member 21, the inertial mass body 92 is rotated, while sliding on the lever member 28, toward the frame member 21 (see FIG. 24).

On an end opposite to the opening 13 of the latch housing portion 82 of the base member 26, a pair of outer plates 105 is extended in parallel with each other from both widthwise outer peripheries, widthwise with respect to the frame member 21, of the pair of insertion grooves 84, respectively. Each of the pair of outer plates 105 is formed into an approximately plate-like shape, whose thickness direction is defined along the widthwise direction of the frame member 21, and facing each other in the widthwise direction of the frame member 21. The distance between the pair of outer plates 105 is set to be approximately the same as the length of the upper end of the slider member 24 in the lengthwise direction.

A Hall IC switch supporting extension 106 is formed on one outer plate 105 positioned adjacent to the permanent magnet 25 of the slider member 24 when the base member 26 is mounted on the frame member 21. The Hall IC switch supporting extension 106 is extended approximately perpendicularly outward from the end portion closer to the frame member 21 of the one outer plate 105. Also, a mechanical switch supporting extension 107 is formed on the other outer plate 105 configured to face the side portion of the slider member 24 opposite to the permanent magnet 25 when the base member 26 is mounted on the frame member 21, in a manner extended approximately perpendicularly outward from the end portion closer to the frame member 21 (see FIG. 19).

As illustrated in FIG. 19, at the mechanical switch supporting extension 107, a horizontal notch portion 108 is provided on a base end portion thereof closer to the other outer plate 105 across almost all the length in lengthwise direction, formed by cutting off the other outer plate 105 by a predetermined height, and also cutting off the mechanical switch supporting extension 107 at the base end portion thereof by such a width as to allow the engagement rib 77 of the slider member 24 to pass through.

Also, as illustrated in FIGS. 9 and 19, end portions closer to the latch housing portion 82 of the Hall IC switch supporting extension 106 and of the mechanical switch supporting extension 107 each have a positioning piece 111, extended from an outer end portion located widthwise outside with respect to the frame member 21 approximately vertically toward the frame member 21. Each positioning piece 111 is formed so as to be fitted into one of a pair of notch portions 112 (see FIG. 5), which are U-shaped in plan view and formed on both side portion of the upper plate 42 of the frame member 21, respectively.

Also, end portions lengthwise opposite to the positioning pieces 111 of the Hall IC switch supporting extension 106 and the mechanical switch supporting extension 107 each have a locking piece 113 extended, from the outer end portion located widthwise outside with respect to the frame member 21, approximately at right angles toward the frame member 21, and then bent at right angles and further extended toward the latch housing portion 82. Each locking piece 113 is formed so as to be engaged with one of a pair of notch portions 115 (see FIG. 5) which are U-shaped in plan view and formed in proximity to the protruding portions 7, respectively, on both side portion of the upper plate 42 of the frame member 21.

Next will be described a way how the base member 26 with the stopper member 27 and the lever member 28 mounted thereon is mounted onto the frame member 21.

As illustrated in FIGS. 3 and 10, one end of the latch spring 31 is fit onto a spring boss 114 which is formed in a standing manner in the center of the ceiling surface of the latch housing portion 82 of the base member 26, and the latch 30 is inserted between the retention plates 83 from a direction of the frame member 21.

Under this state, the latch housing portion 82 of the base member 26 is put inside the latch supporting frame 61 of the slide button 11, the side walls 62 of the slide button 11 are inserted into the insertion grooves 84, and the engagement rib 77 of the slider member 24 is passed through the horizontal notch portion 108 and pushed toward the frame member 21. Thereby, the positioning pieces 111 of the base member 26 are fitted into the notch portions 112 of the frame member 21 respectively, and the locking pieces 113 of the base member 26, each of which is approximately L-shaped in front view, are pushed into and engaged with the notch portions 115 of the frame member 21.

As a result, the base member 26 is locked on the frame member 21 in a state that the latch 30 and the latch spring 31 are housed inside the latch housing portion 82. Also, the engagement rib 77 of the slider member 24 becomes lengthwise slidable, integrally with the ejector 22, along the outer surface of the other outer plate 105 of the base member 26 through the horizontal notch portion 108. The side walls 62 of the slide button 11 become slidable in the insertion grooves 84 of the base member 26, respectively.

Next, as illustrated in FIG. 11, each rivet 33 is inserted through each rivet insertion hole 116 of the base member 26, passed through each rivet hole 117 penetrating the upper plate 42 of the frame member 21 and through a rivet hole which is not shown, penetrating the lower plate 43 in a position corresponding to each rivet hole 117, and then calked. As a result, the base member 26 is fixed on the frame member 21.

As illustrated in FIGS. 3 and 11, one end of the button spring 32 is fitted onto a rod 118, which is cross-shaped in cross section, erected toward the latch housing portion 82 from the center in the width direction of the upper end portion of a side wall portion opposite to the latch housing portion 82 of the base member 26. The other end of the button spring 32 is then fitted onto a projecting portion 121, which is cross-shaped in cross section, installed at the center of the upper end portion on the side closer to the extending portion 71 of the side wall portion opposite to the operation portion 56 of the latch supporting frame 61 of the slide button 11. A cover portion 122 is provided around the projecting portion 121 in a standing manner so as to abut on the circumference of the other end of the button spring 32. As a result, the slide button 11 is urged toward the opening 13 by the button spring 32, and moves in a sliding manner toward the opening 13 when the operation portion 56 is released after being pressed.

Here, as illustrated in FIG. 10, the latch 30 is formed into approximately U-shaped in front view and has abutment pieces 125 extended from an upper end, widthwise outward. An engagement piece 126 is extended from the widthwise center of the latch 30 toward the frame member 21. The engagement piece 126 is designed to fit into a through hole 127 (see FIGS. 3 and 5) formed in the upper plate 42 and a through hole 128 (see FIGS. 3 and 5) formed in the lower plate 43 of the frame member 21, and penetrates both through holes 127 and 128 by moving toward the lower plate 43.

Also, as illustrated in FIG. 3, the retention plates 83 of the base member 26 prevent movement of the latch 30 in the lengthwise direction with respect to the frame member 21, and allow movement thereof in a direction of engagement or in a direction of disengagement (downward or upward, in FIG. 3). The other end of the latch spring 31, one end of which is fitted onto the spring boss 114 provided on the ceiling surface inside the latch housing portion 82, abuts on a concave portion on the upper surface of the latch 30, and urges the latch 30 in the direction of engagement, namely, toward the frame member 21.

Each abutment piece 125 of the latch 30 can abut on each stopper 65 provided in the latch supporting frame 61 of the slide button 11, and in a state abutting on the lower surface of the abutment piece 125, each stopper 65 prevents movement of the latch 30 in the direction of engagement, namely, toward the frame member 21. A predetermined clearance is formed between the lower surface of each stopper 65 and each button slope 66, and the lower surface of each stopper 65 can also abut on the upper surface of each abutment piece 125 of the latch 30. In a state abutting on the upper surface of the abutment piece 125, each stopper 65 prevents movement of the latch 30 in the direction of disengagement, namely, in the direction away from the frame member 21.

[Switches]

Figure 12:
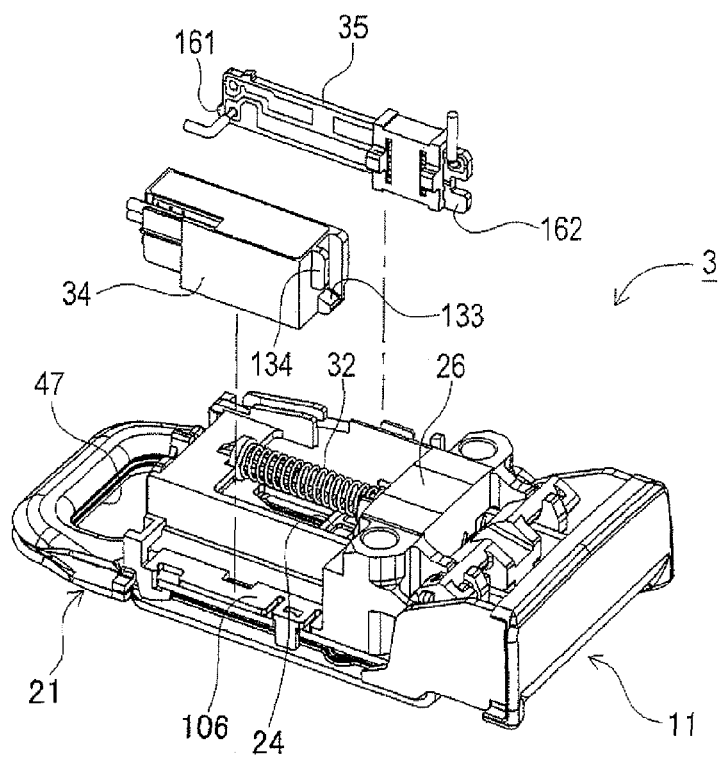
FIG. 12 is an explanatory view depicting assembly of switches to the base member.
Figure 14:
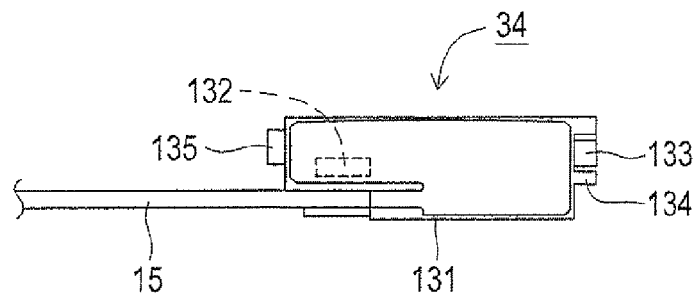
FIG. 14 is a plan view of the Hall IC switch.
Figure 15:
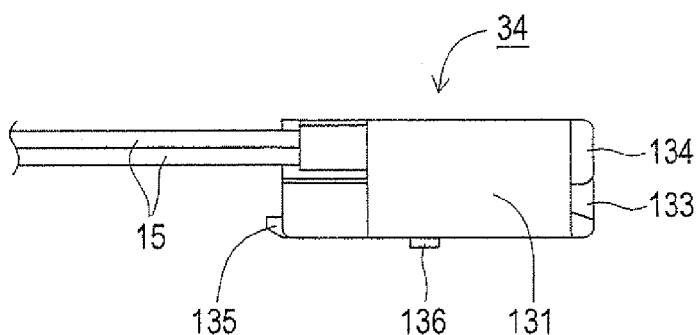
FIG. 15 is a front view of the Hall IC switch.
Figure 16:
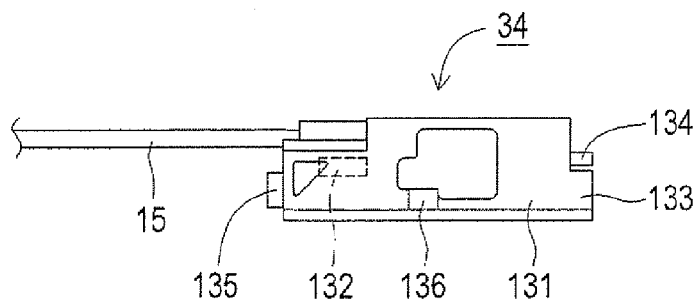
FIG. 16 is a bottom view of the Hall IC switch.
Figure 17:
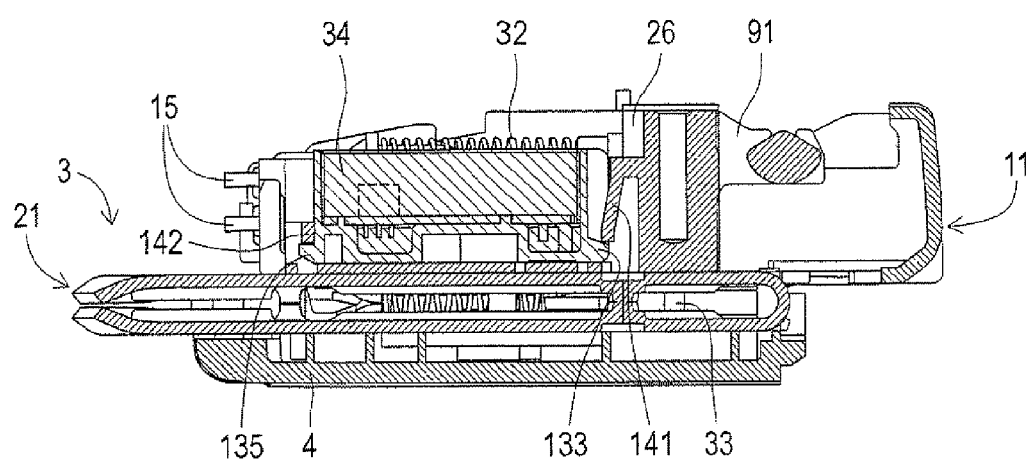
FIG. 17 is a cross sectional view along line X2-X2 in FIG. 2.
Figure 18:
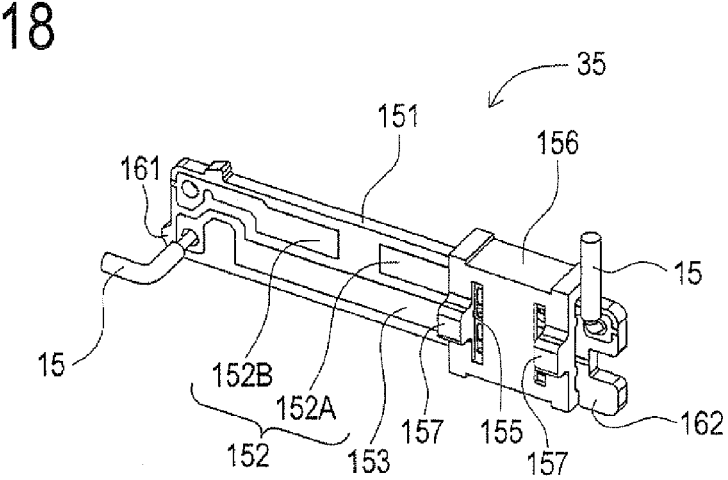
FIG. 18 is a perspective view of the mechanical switch.

Next, mounting of the Hall IC switch 34 and the mechanical switch 35 will be described based on FIGS. 12 through 19. FIG. 12 is an explanatory view depicting assembly of switches 34, 35 to the base member 26. FIGS. 14 through 16 are a plan view, a front view and a bottom view of the Hall IC switch 34. FIG. 17 is a cross sectional view along line X2-X2 in FIG. 2. FIG. 18 is a perspective view of the mechanical switch 35.

As illustrated in FIG. 12, after the base member 26 is fixed to the frame member 21 by each rivet 33, the Hall IC switch 34 is fixed on the Hall IC switch supporting extension 106 of the base member 26 with the button spring 32 mounted thereon. The mechanical switch 35 is also fixed on the mechanical switch supporting extension 107 of the base member 26. The buckle main body 3 is thus assembled. Alternatively, only one of the Hall IC switch 34 and the mechanical switch 35 may be mounted as needed.

Here, the mounting of the Hall IC switch 34 onto the base member 26 will be described based on FIGS. 13 through 17. As illustrated in FIGS. 13 through 16, the Hall IC switch 34 has a Hall element 132 which detects magnetism is provided inside a case 131 made of synthetic resin, formed into an approximately rectangle shape in plan view, long in the lengthwise direction of the frame member 21, and approximately rectangular-parallelepiped shape. The Hall IC switch 34 is a switch that outputs ON/OFF signals in accordance with the proximity of the permanent magnet 25 to the Hall element 132.

Inside the Hall IC switch 34, the Hall element 132 is arranged in the proximity of an end portion where the lead wires 15 inside the case 131 are extracted, namely, in the proximity of an end portion opposite to the opening 13 in the lengthwise direction of the frame member 21. Accordingly, the permanent magnet 25 is configured to face the Hall element 132 of the Hall IC switch 34 when the slider member 24 is moved to the side opposite to the opening 13 in the lengthwise direction of the frame member 21

In addition, the Hall IC switch 34 has a locking projection 133, which is approximately L-shaped in front view, formed on one lengthwise end face closer to the slide button 11. One portion of the locking projection 133 is extended outward from whole length of a side edge portion closer to the one outer plate 105 of the base member 26, and the other portion thereof is extended outward from part of a lower edge portion of the one lengthwise end face, the part ranging from the approximately center point thereof to an end portion closer to the one outer plate 105. On the same one lengthwise end face, a guiding piece 134 is extended outward from an upper edge portion thereof to the vertically center point, arranged in parallel with the one portion of the locking projection 133.

Further, the Hall IC switch 34 has an engagement projection 135 formed thereon, extended with a predetermined width outward from the approximately widthwise center position of the lower edge, on the other lengthwise end face opposite to the one lengthwise end face closer to the slide button 11. The Hall IC switch 34 yet further has a positioning projection 136 formed thereon, approximately quadrangular in cross section and projecting downward, on the bottom face thereof, at the approximately central position in the side edge closer to the one outer plate 105. The positioning projection 136 is formed so as to have a height approximately equal to the thickness of the Hall IC switch supporting extension 106.

Meanwhile, as illustrated in FIG. 13, the base member 26 has an elastic locking piece 141, provided on a wall portion which is formed by being extended at right angles outward from an edge closer to the slide button 11 of the one outer plate 105 where the Hall IC switch supporting extension 106 is formed. The elastic locking piece 141 is approximately plate-shaped and elastically-deformable toward the slide button 11, being obliquely extended from the upper edge of a portion corresponding to the locking projection 133 of the Hall IC switch 34, toward the Hall IC switch supporting extension 106. Further, the clearance between the lower end of the elastic locking piece 141 and the upper face of the Hall IC switch supporting extension 106 is designed to be approximately equivalent to the thickness of the locking projection 133 of the Hall IC switch 34.

There is formed an engagement frame 142, which is approximately quadrangular-frame shaped in front view, on a lengthwise edge portion closer to the locking piece 113 of the Hall IC switch supporting extension 106. Into the engagement frame 142, the engagement projection 135 of the Hall IC switch 34 is fitted. Further, a through hole 143, which is rectangular-shaped in plan view, is formed on the approximately center portion in the lengthwise direction of an edge portion closer to the one outer plate 105 of the Hall IC switch supporting extension 106. Into the through hole 143, the positioning projection 136 provided in a standing manner on the bottom face of the Hall IC switch 34 is fitted.

As illustrated in FIG. 17, while the engagement projection 135 is fitted into the engagement frame 142 of the base member 26, the Hall IC switch 34 is pressed onto the Hall IC switch supporting extension 106, and thereby the lower end portion of the locking projection 133 of the Hall IC switch 34 is engaged with the lower end portion of the elastic locking piece 141 of the base member 26. Further, the positioning projection 136 provided in a standing manner on the bottom face of the Hall IC switch 34 is fitted into the through hole 143 formed in the approximately lengthwise center portion of the edge portion closer to the outer plate 105 of the Hall IC switch supporting extension 106.

Further, as illustrated in FIGS. 2 and 13, the lead wires 15 of the Hall IC switch 34 are bent at right angles along the outer periphery of the base member 26 and then drawn out in the lengthwise direction of the frame member 21 through a lead stopping piece 145, which is L-shaped in side view and provided at a side wall positioned opposite to the latch housing portion 82 of the base member 26. Thereby, the Hall IC switch 34 is irremovably mounted on the outside of the one outer plate 105 of the base member 26.

Next, the mounting of the mechanical switch 35 onto the base member 26 will be described based on FIGS. 2, 18 and 19.

As illustrated in FIGS. 18 and 19, the mechanical switch 35 includes a printed circuit board 151 which is formed approximately in a rectangular shape, in a manner facing almost all the surface of the other outer plate 105 of the base member 26; two printed wirings 152 and 153 each of which is line-shaped, formed of such material as gold-plated copper foil, and arranged along the lengthwise direction in parallel with each other on the printed circuit board 151 on a surface thereof facing the outer plate 105; and a slide brush 156 which is made of synthetic resin, formed approximately in a quadrangle in front view, provided slidably lengthwise, and fitted onto both widthwise edges of the printed circuit board 151 in a state of pressing onto the printed circuit board 151 a brush 155 formed of such material as phosphor bronze and configured to make the printed wirings 152 and 153 electrically connected therebetween.

The printed wiring 152, which is one of the above printed wirings 152 and 153, is cut off by a predetermined length approximately in a middle, so as to form printed wirings 152A and 152B arranged in a straight line and electrically disconnected. The lead wires 15 are soldered on the printed wirings 152A and 153, respectively. Accordingly, when the slide brush 156 comes onto the printed wiring 152A, the printed wirings 152A and 153 are electrically connected by the brush 155, and the circuit is connected through the lead wires 15.

Meanwhile, when the slide brush 156 comes onto the printed wiring 15213, the printed wirings 152A and 153 are electrically disconnected and the circuit is broken through the lead wires 15. That is, the mechanical switch 35 operates as a switch which outputs an ON/OFF signal in accordance with a position onto which the slide brush 156 is moved.

The slide brush 156 has a pair of projecting pieces 157 projecting outward to a predetermined height, provided on both edges thereof in the slide direction on a surface facing the outer plate 105, respectively. Then, as later described, the engagement rib 77 of the slider member 24 comes between the pair of projecting pieces 157 when the mechanical switch 35 is mounted on the base member 26.

Further, as illustrated in FIG. 19, engagement projections 161 and 162 projecting outward are formed on both lengthwise end faces of the printed circuit board 151, respectively, at end portions closer to the mechanical switch supporting extension 107. Meanwhile, a pair of insertion grooves 163 is formed on both lengthwise end portions of the mechanical switch supporting extension 107 of the base member 26. Both edge portions of the printed circuit board 151 are inserted into the pair of insertion grooves 163 from above in FIG. 19.

Of the both lengthwise end portions of the mechanical switch supporting extension 107, on a lengthwise end portion closer to the locking piece 113, one of the insertion grooves 163 is formed, and on an outer side thereof, an engagement frame 164 is formed, in an approximately quadrangular frame shape in front view. The engagement frame 164 is configured to receive the engagement projection 161 of the printed circuit board 151 inserted therein. An elastic engagement piece 165 is also provided on an outer side of the other of the insertion grooves 163 which is formed at the other lengthwise end portion closer to the slide button 11 of the mechanical switch supporting extension 107. The elastic engagement piece 165 is elastically deformable outward, extended toward the mechanical switch supporting extension 107, so as to secure a clearance as high as the engagement projection 162 of the printed circuit board 151.

Accordingly, the mechanical switch 35 can place the printed wirings 152 and 153 in a position facing the outer plate 105, and can make the slide brush 156 in a state moved closer to the slide button 11, that is, a state where the lead wires 15 are electrically connected. The engagement projection 161 of the mechanical switch 35 is fitted into the engagement frame 164 of the base member 26, while the both end portions are inserted into the insertion grooves 163 and pressed onto the mechanical switch supporting projection 107, and thereby the engagement projection 162 is engaged with the elastic engagement piece 165. The engagement rib 77 of the slider member 24 is then positioned between the projecting pieces 157 of the slide brush 156.

Further, as illustrated in FIGS. 2 and 19, the lead wires 15 of the mechanical switch 35 are bent approximately along the outer periphery of the base member 26 and then drawn out in the lengthwise direction of the frame member 21 through a lead stopping piece 167, which is L-shaped in side view and provided at the upper end of the other outer plate 105 and a lead stopping piece 168, which is L-shaped in side view and provided at the side wall positioned opposite to the latch housing portion 82 of the base member 26. Thereby, the mechanical switch 35 is irremovably mounted on the outside of the other outer plate 105 of the base member 26. Also, the slide brush 156 slidingly moves integrally with the slider member 24 in the lengthwise direction of the frame member 21 (see FIGS. 2 and 20).

[Tongue Plate]

Figure 20:
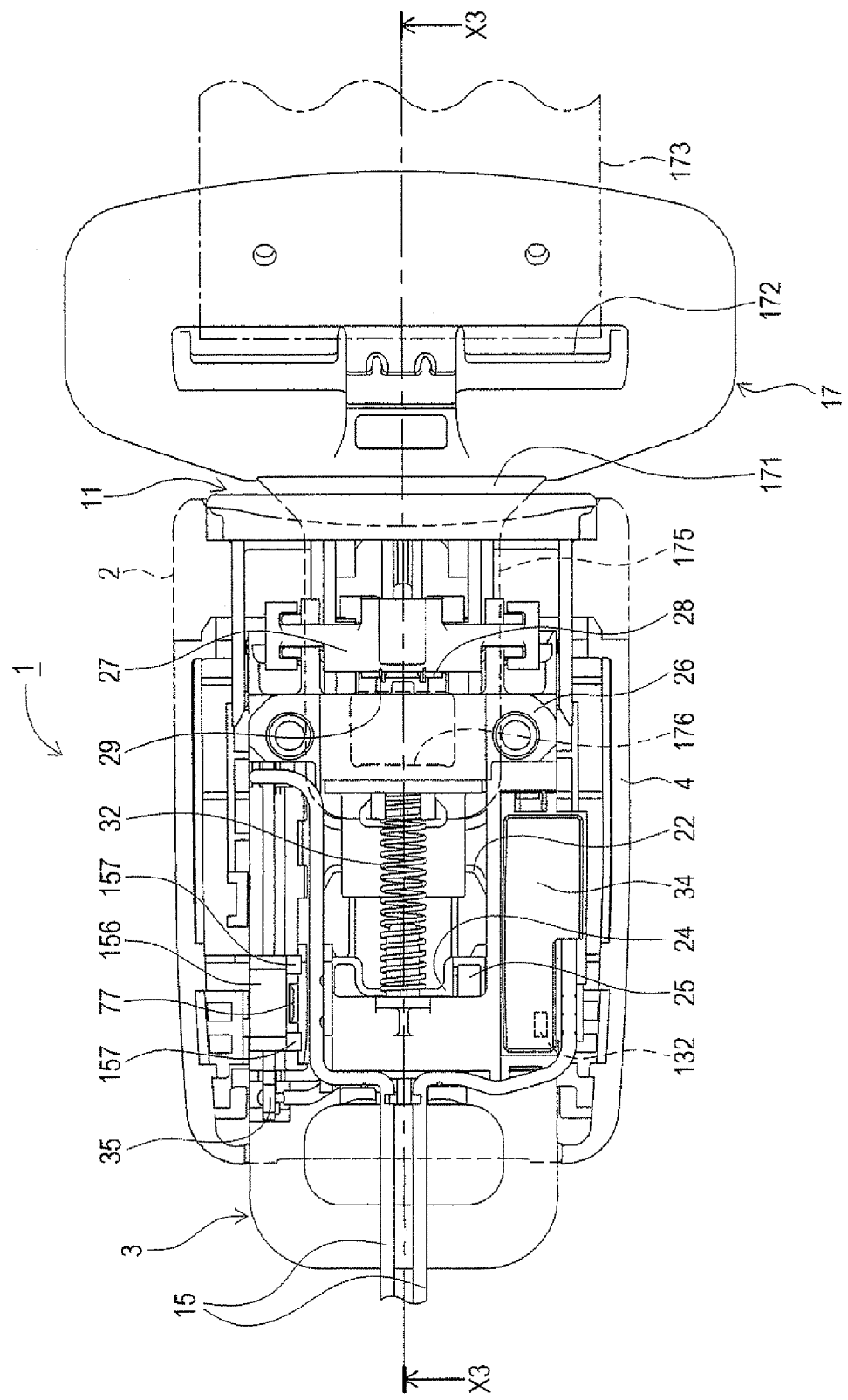
FIG. 20 is a plan view of a buckle device in a state where a tongue plate is inserted and the upper cover is removed.
Figure 21:
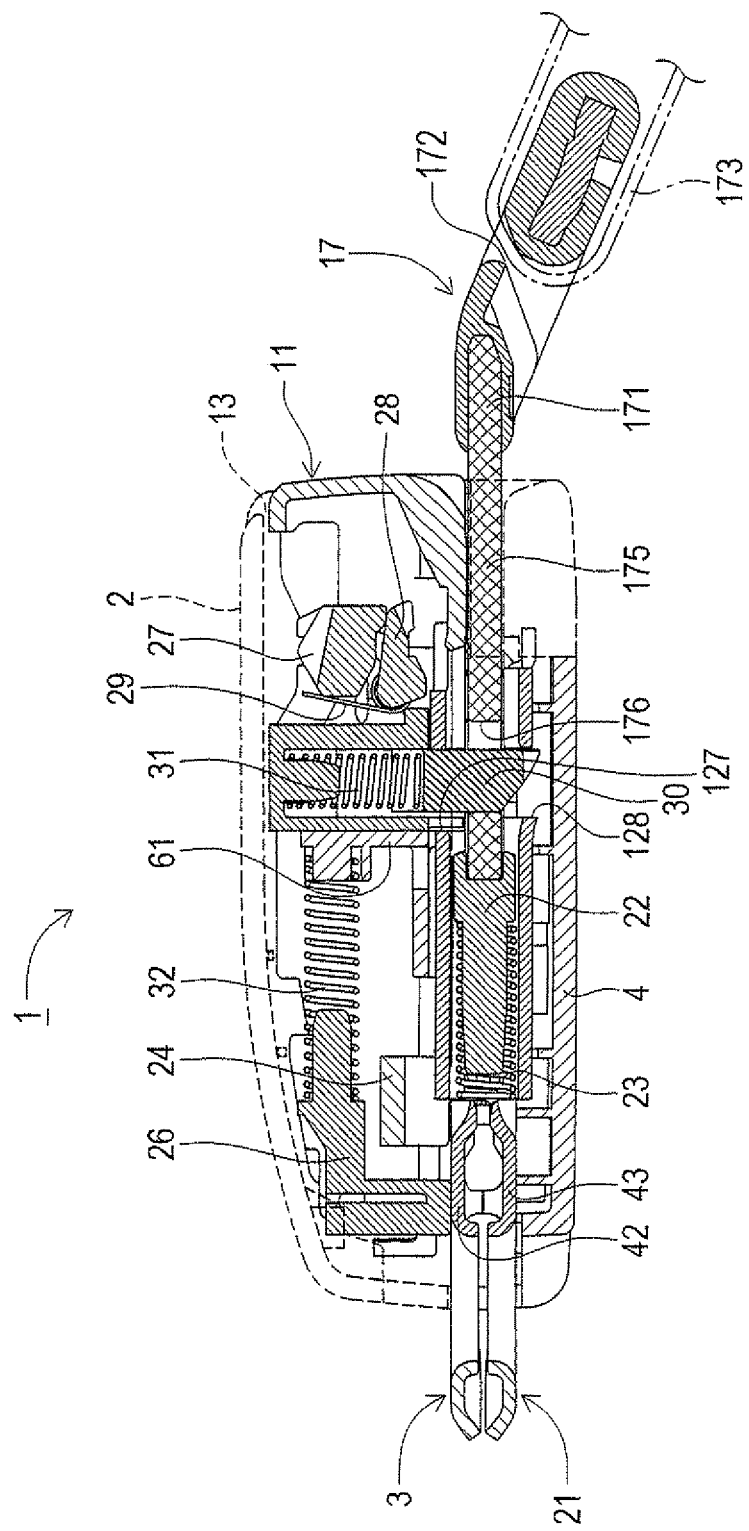
FIG. 21 is a cross sectional view along line X3-X3 in FIG. 20.

Hereinafter, a schematic configuration of the tongue plate 17 will be described based on FIGS. 2, 20 and 21. FIG. 20 is a plan view of a buckle device 1 in a state where a tongue plate 17 is inserted and the upper cover 2 is removed. FIG. 21 is a cross sectional view along line X3-X3 in FIG. 20.

As illustrated in FIGS. 2 and 20, the tongue plate 17 is provided with a tongue main body 171 formed of metal such as stainless steel into a plate-like shape and coated with a synthetic resin material on the periphery. The tongue main body 171 has a slit hole 172 formed therein, through which a long strip of webbing 173 is passed.

One end of the webbing 173 is secured to a vehicle body on the opposite side to the buckle device 1 across a seat, and the other end thereof is wound around a take-up drum, which is urged in a direction of taking-up of a seatbelt retractor (not shown). The seatbelt retractor has employed a pretensioner (not shown) which abruptly takes up a predetermined length of the webbing 173 in a tightening direction in a vehicular emergency situation such as a collision, through rotating the take-up drum in high speed, so as to firmly restrain an occupant on the seat.

Meanwhile, the tip of the tongue plate 17 operates as an insertion plate portion 175, and is configured to be inserted from the opening 13 to the inside of the buckle main body 3, that is, to the insertion portion 45 formed between the upper plate 42 and the lower plate 43. An engagement hole 176, which is approximately rectangular-shaped, is formed in the insertion plate portion 175. When the insertion plate portion 175 is inserted in the insertion portion 45 by a predetermined depth, the engagement hole 176 overlaps the through holes 127 and 128 provided at corresponding positions in the upper plate 42 and the lower plate 43, and the engagement piece 126 of the latch 30 passes through the through holes 127 and 128, so that the engagement piece 126 penetrates the engagement hole 176.

[Operation and Effects in Normal Times]

Next, the operation and effects in normal times with respect to the buckle device 1 as above configured will be described based on FIGS. 2, 3, 20 and 21. In a state where the insertion plate portion 175 of the tongue plate 17 is not inserted in the insertion portion 45 as illustrated in FIGS. 2 and 3, the stoppers 65 of the slide button 11 abut on the abutment pieces 125 of the latch 30 respectively from below, so that the latch 30 will not be moved toward the frame member 21 by the urging force of the latch spring 31.

As the insertion plate portion 175 of the tongue plate 17 is inserted from the opening 13 to the insertion portion 45, the insertion plate portion 175 first engages with a concave portion formed at the front end of the ejector 22, and the insertion plate portion 175 presses the ejector 22. Following this, as the insertion plate portion 175 is further inserted against the urging force of the ejector spring 23 until the ejector 22 is slidingly moved to a predetermined position, the main body portion 50 of the ejector 22 abuts on the leg portions 72 of the slide button 11, presses and slidingly moves the leg portions 72 in a direction lengthwise opposite to the opening 13 with respect to the frame member 21.

As the leg portions 72 are slidingly moved in the direction lengthwise opposite to the opening 13 with respect to the frame member 21, the stoppers 65 of the slide button 11 are removed from the abutment pieces 125 of the latch 30, so that the latch 30 is moved by the urging force of the latch spring 31 in the direction of engagement, namely, in the direction toward the frame member 21.

Accordingly, as illustrated in FIGS. 20 and 21, the engagement piece 126 of the latch 30 penetrates the through hole 127 of the upper plate 42 and the through hole 128 of the lower plate 43, and also penetrates the engagement hole 176 of the tongue plate 17. Then the engagement piece 126 of the latch 30 engages with the engagement hole 176 of the tongue plate 17.

Following this, when the pressure on the tongue plate 17 is released, the slide button 11 is slidingly moved toward the opening 13 by the urging force of the button spring 32, and a locked state as illustrated in FIGS. 20 and 21 is reached. The stoppers 65 of the slide button 11 abut on the abutment pieces 125 of the latch 30 respectively from above, preventing the latch 30 from moving in a disengagement direction, namely, in a direction to come off from the frame member 21. In this locked state, the removal of the tongue plate 17 from the buckle device 1 is restricted by the engagement piece 126 of the latch 30.

Further, in the state where the insertion plate portion 175 of the tongue plate 17 is not inserted inside the insertion portion 45 as illustrated in FIG. 2, the ejector 22 is slidingly moved by the ejector spring 23 toward the opening 13, and the slider member 24 engaged at the tips of the elastic locking pieces 52 of the ejector 22 abuts on the latch supporting frame 61 of the slide button 11. Consequently, the permanent magnet 25 secured in the slider member 24 is separated from the Hall element 132 of the Hall IC switch 34, so that the Hall IC switch 34 outputs an OFF signal.

Further, the slide brush 156 of the mechanical switch 35 is slidingly moved toward the opening 13 by the engagement rib 77 of the slider member 24 which is positioned between the pair of projecting pieces 157, and the printed wirings 152A and 153 are electrically connected. Consequently, in the mechanical switch 35, the circuit is connected through the lead wires 15, and an ON signal is output.

Meanwhile, as illustrated in FIG. 20, in the locked state where the tongue plate 17 is inserted in the insertion portion 45 and the engagement piece 126 of the latch 30 engages with the engagement hole 176, the ejector 22 has been slidingly moved by the insertion plate portion 175 of the tongue plate 17, in the direction lengthwise opposite to the opening 13 with respect to the frame member 21. Further, the slider member 24 engaged at the tips of the elastic locking pieces 52 of the ejector 22 is positioned in the proximity of the side wall portion opposite to the latch housing portion 82 of the base member 26. Consequently, the permanent magnet 25 secured in the slider member 24 is positioned in the proximity of the Hall element 132 of the Hall IC switch 34, so that the Hall IC switch 34 outputs an ON signal.

Further, the slide brush 156 of the mechanical switch 35 is slidingly moved toward the engagement projection 161, namely, in the direction opposite to the opening 13 by the engagement rib 77 of the slider member 24 which is positioned between the pair of projecting pieces 157, and the printed wirings 152A and 153 are electrically disconnected. Consequently, in the mechanical switch 35, the circuit is disconnected through the lead wires 15, and an OFF signal is output.

Further, as the buckle device 1 will not move abruptly toward the take-up direction of the webbing 173, no inertial force acts on the inertial mass body 92 of the stopper member 27. Consequently, the lever member 28 is maintained in a state rotated toward the stopper member 27 by the urging force of the torsion spring 29 and approximately parallel with the frame member 21.

[Release of Tongue Plate from Buckle Main Body]

Figure 22:
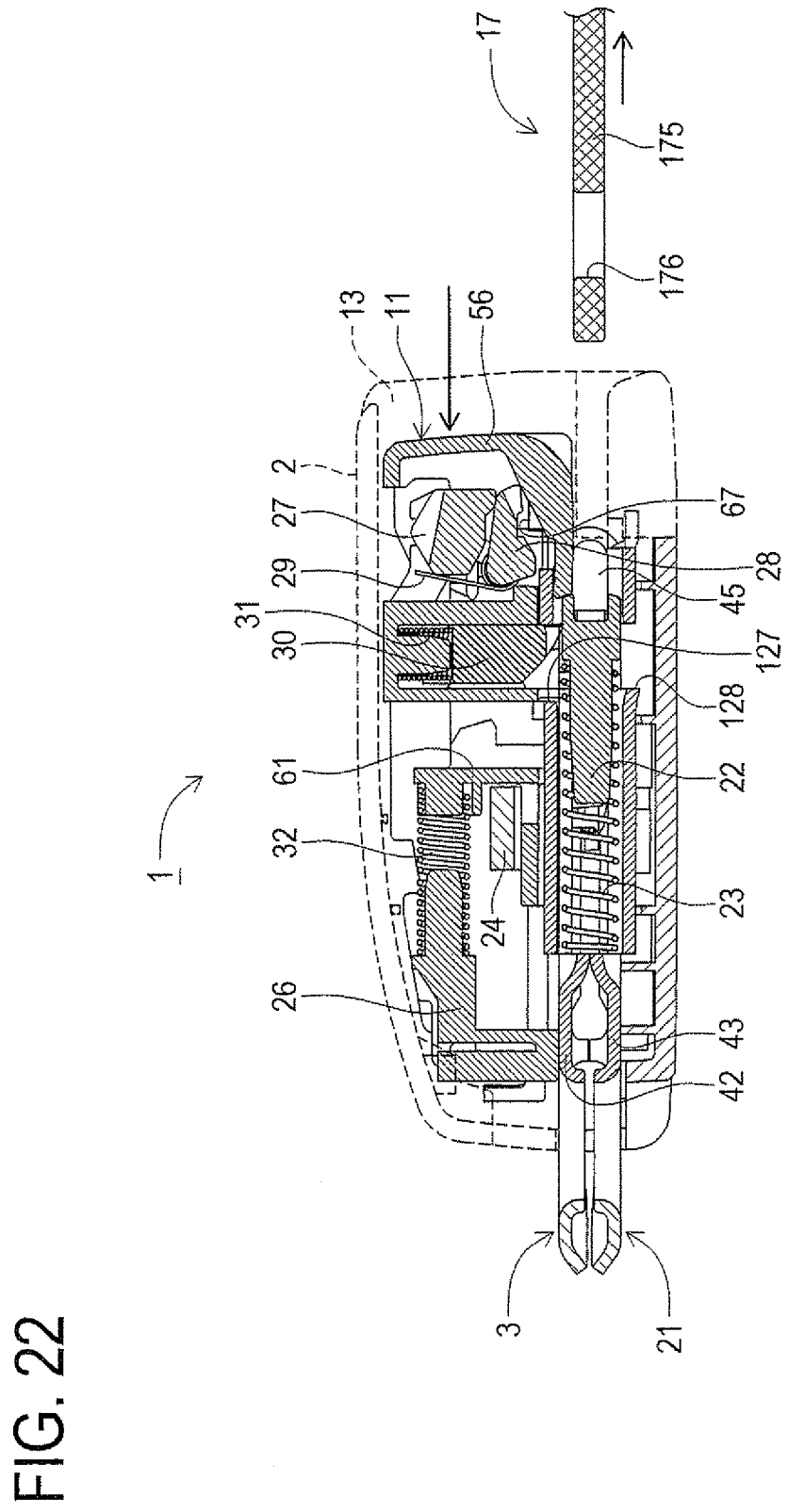
FIG. 22 is a cross sectional view depicting a state where the tongue plate is released by pressing the slide button.

Next, the release of the tongue plate 17 from the buckle main body 1 will be discussed based on FIG. 22. FIG. 22 is a cross sectional view depicting a state where the tongue plate 17 is released by pressing the slide button 11.

As illustrated in FIG. 22, for releasing the tongue plate 17 from the buckle main body 3, the operation portion 56 of the slide button 11 is slidingly moved by being pressed with a finger against the urging force of the button spring 32, so that the button slopes 66 of the slide button 11 are slidingly moved while having contact with the lower sides of the abutment pieces 125 of the latch 30, respectively. Thereby the engagement piece 126 of the latch 30 is moved, against the urging force of the latch spring 31, in a disengagement direction, that is, in the direction away from the frame member 21. In the meantime the abutment portions 67 which are formed inside the side walls 62 of the slide button 11 pass below the projecting pieces 88 of the lever member 28.

Accordingly, the engagement piece 126 of the latch 30 is removed from the through holes 127 and 128 in the upper plate 42 and the lower plate 43, and also removed from the engagement hole 176 in the tongue plate 17, so that a disengagement state is reached. Here, the front end of the ejector 22 abuts on the tip of the insertion plate portion 175 of the tongue plate 17, so that the tongue plate 17 is urged toward the opening 13 and pushed out. The ejector 22 is urged by the urging force of the ejector spring 23 toward the opening 13, and moved toward the insertion hole 46, overlaps and blocks the through holes 127 and 128 and abuts on the lower end of the engagement piece 126 of the latch 30.

When the finger is released from the slide button 11, the slide button 11 is urged by the urging force of the button spring 32 toward the opening 13, and returns to the normal position of the slide button 11. Accordingly, the stoppers 65 of the slide button 11 abut on the abutment pieces 125 of the latch 30 from below respectively, so that the urging force of the latch spring 31 works to prevent the latch 30 from moving toward the frame member 21.

As the buckle device 1 will not move abruptly toward the take-up direction of the webbing 173, no inertial force acts on the inertial mass body 92 of the stopper member 27. Consequently, the lever member 28 is maintained in a state rotated toward the stopper member 27 by the urging force of the torsion spring 29 and approximately parallel with the frame member 21.

[Operation and Effects at Activation of Pretensioner for Seatbelt Retractor]

Figure 23:
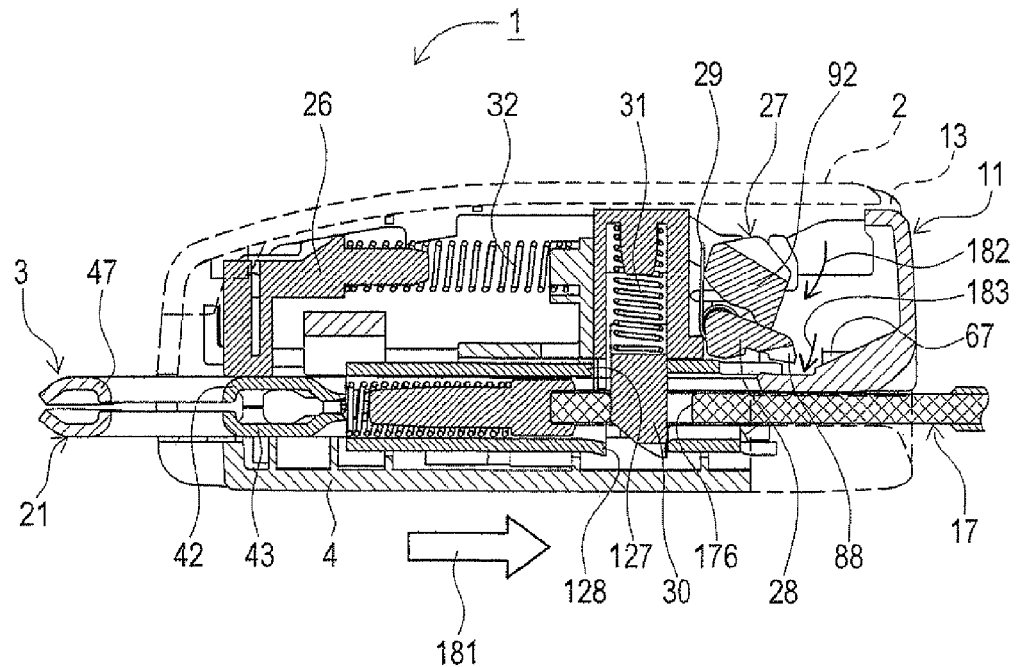
FIG. 23 is a cross sectional view depicting a state where a pretensioner for a seatbelt retractor is activated.
Figure 24:
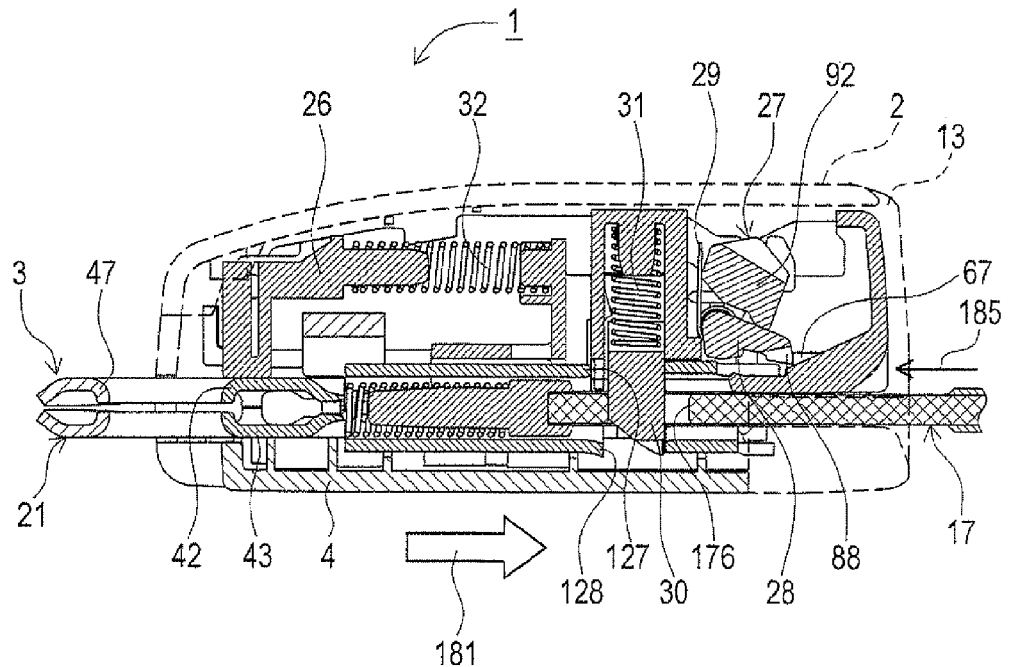
FIG. 24 is a cross sectional view depicting a state where the slide button is moved by the activation of the pretensioner for the seatbelt retractor.

Next, the operation and effects when the pretensioner for the seatbelt retractor is activated will be discussed based on FIGS. 23 and 24. FIG. 23 is a cross sectional view depicting a state where the pretensioner for the seatbelt retractor is activated. FIG. 24 is a cross sectional view depicting a state where the slide button 11 is moved by the activation of the pretensioner for the seatbelt retractor.

As illustrated in FIG. 23, when the pretensioner for the seatbelt retractor is activated, the webbing 173 passed through the tongue plate 17 is abruptly taken up in the tightening direction by a predetermined length. Then, as the engagement piece 126 of the latch 30 is engaged with the engagement hole 176 of the tongue plate 17, the buckle main body 3 experiences abrupt acceleration toward the webbing 173 (that is, in the direction of arrow 181), and an inertial force in the direction opposite to the opening 13 acts on the inertial mass body 92 of the stopper member 27, in a lengthwise direction of the frame member 21.

In addition, the center of gravity of the inertial mass body 92 is eccentric toward the frame member 21, with respect to the axis core of the stopper rotating shaft 93 of the stopper member 27. Accordingly, the inertial mass body 92 of the stopper member 27 is rotated, against the urging force of the torsion spring 29 urged through the lever member 28, toward the frame member 21 (that is, in the direction of arrow 182). Thereby, the end portion closer to the opening 13 of the inertial mass body 92 of the stopper member 27 is slidingly moved on the upper face of the lever member 28 in the direction lengthwise opposite to the opening 13 with respect to the frame member 21, and rotates the lever member 28 toward the frame member 21 (that is, in the direction of arrow 183).

Further, when rotated toward the frame member 21, the lever member 28 is rotated to a position where each of the projecting pieces 88 is opposed to each of the abutment portions 67 which are formed on inner surfaces of the side walls 62 of the operation portion 56 of the slide button 11.

Next, as illustrated in FIG. 24, when abrupt acceleration acts on the buckle main body 3 toward the webbing 173 (that is, in the direction of arrow 181), the slide button 11 also experiences an inertial force in the direction opposite to the opening 13 (that is, in the direction of arrow 185), then the slide button 11 is slidingly moved, against the urging force of the button spring 32, in the lengthwise direction of the frame member 21, that is, in the direction to release the engagement of the tongue plate 17 and the latch 30.

Meanwhile, the projecting pieces 88 of the lever member 28 are rotated by the rotation of the inertial mass body 92, to the position where the projecting pieces 88 face the abutment portions 67 of the slide button 11 respectively. Thus, the projecting pieces 88 of the lever member 28 catch the abutment portions 67 of the slide button 11 which have started slide movement in the direction lengthwise opposite to the opening 13 with respect to the frame member 21, respectively, and stop the slide movement in the direction opposite to the opening 13 of the slide button 11, so that the release of the engagement of the latch 30 and the tongue plate 17 can be prevented. Thereby, when the pretensioner for the seatbelt retractor is activated, the tongue plate 17 can be surely prevented from being removed from the buckle main body 3.

After the activation of the pretensioner for the seatbelt retractor, the slide button 11 returns to the normal position thereof closer to the opening 13 by the urging force of the button spring 32. Further, the stopper member 27 is rotated by the urging force of the torsion spring 29 through the lever member 28 in a direction away from the frame member 21, so that the projections 103 abut on the rotation restricting pieces 97 of the base member 26, respectively. Further, the lever member 28 returns by the urging force of the torsion spring 29 to the state approximately parallel to the frame member 21.

As has been described in detail, according to the buckle device 1 of the present embodiment, the frame member 21, which is approximately U-shaped in side view, has the ejector 22 having elastic locking pieces 52 whose tips are configured to move along the long holes 63 formed in the upper plate 42, mounted thereon. The permanent magnet 25 is mounted on the slider member 24, at the end portion closer to the Hall IC switch 34. The pairs of elastic engagement pieces 78 of the slider member 24 are respectively inserted through the long holes 63, and engaged with the engagement portions 79 provided at the tips of elastic engagement pieces 52 of the ejector 22 and thus assembled. In the base member 26 formed approximately rectangular-frame-shaped in plan view, the Hall IC switch 34 is fitted on the Hall IC switch supporting extension 106, extended approximately perpendicularly outward from the end portion closer to the frame member 21 of the one outer plate 105 thereof positioned adjacent to the permanent magnet 25.

As a result, when the insertion plate portion 175 of the tongue plate 17 is not inserted in the insertion portion 45 of the frame member 21, the permanent magnet 25 fixed to the slider member 24 is located away from the Hall element 132 of the Hall IC switch 34, and then the Hall IC switch 34 outputs an OFF signal. Meanwhile, in the locked state where the tongue plate 17 is inserted in the insertion portion 45 and the engagement piece 126 of the latch 30 is engaged with the engagement hole 176, the ejector 22 is slidingly moved in a direction lengthwise opposite to the opening 13 with respect to the frame member 21 by the insertion plate portion 175 of the tongue plate 17. Accordingly, as the permanent magnet 25 fixed to the slider member 24 is located in the proximity to the Hall element 132 of the Hall IC switch 34, the Hall IC switch 34 outputs an ON signal. As a result, through detecting an ON/OFF signal of the Hall IC switch 34, the engagement and disengagement between the tongue plate 17 and the latch 30 can be reliably detected.

Further, the mechanical switch 35 is locked on the mechanical switch supporting extension 107, in a state where the engagement rib 77 of the slider member 24 is positioned between the pair of projecting pieces 157 of the slide brush 156. The engagement rib 77 is approximately L-shaped in side view, projecting from the horizontal notch portion 108 formed on the side edge portion on the side closer to the frame member 21, of the outer plate 105 of the base member 26. In other words, the mechanical switch 35 is fitted on the mechanical switch supporting extension 107, in the state where the pair of projecting pieces 157 of the slide brush 156 is positioned side by side with the two lateral sides of the engagement rib 77, respectively.

As a result, when the insertion plate portion 175 of the tongue plate 17 is not inserted in the insertion portion 45 of the frame member 21, the slide brush 156 of the mechanical switch 35 is slidingly moved toward the opening 13 by the engagement rib 77 of the slider member 24 positioned between the pair of projecting pieces 157, and the printed wirings 152A and 153 are electrically connected. Accordingly, the mechanical switch 35 outputs an ON signal as the circuit is connected through the lead wires 15.

Meanwhile, in the locked state where the tongue plate 17 is inserted in the insertion portion 45 and the engagement piece 126 of the latch 30 is engaged with the engagement hole 176; the ejector 22 is slidingly moved in a direction opposite to the opening 13 by the insertion plate portion 175 of the tongue plate 17. Accordingly, the slide brush 156 is slidingly moved toward the engagement projection 161, namely, in the direction opposite to the opening 13, by the engagement rib 77 positioned between the pair of projecting pieces 157, and the printed wirings 152A and 153 are electrically disconnected. As a result, the mechanical switch 35 outputs an OFF signal as the circuit is disconnected through the lead wires 15.

Accordingly, through detecting the ON/OFF signal from the mechanical switch 35, the engagement and disengagement between the tongue plate 17 and the latch 30 can be reliably detected. In addition, even if either the Hall IC switch 34 or the mechanical switch 35 malfunctions, the engagement and disengagement between the tongue plate 17 and the latch 30 can be reliably detected. Accordingly, the reliability thereof can be improved.

In addition, in the Hal IC switch 34, while the engagement projection 135 is fitted into the engagement frame 142 of the base member 26, the engagement projection 135 is pushed onto the Hall IC supporting projection 106, and thereby, the lower end of the locking projection 133 of the Hal IC switch 34 is locked with the lower end portion of the elastic locking piece 141 of the base member 26. As a result, the Hall IC switch 34 can be mounted on the buckle main body 3 with a single operation. Accordingly, the efficiency in assembly of the buckle device can be improved.

Further, in a state where the slide brush 156 of the mechanical switch 35 is moved in a direction toward the slide button 11, the engagement projection 161 of the mechanical switch 35 is fitted inside the engagement frame 164 of the base member 26 while each end portion is fitted into each insertion groove 163 and pushed onto the mechanical switch supporting projection 107. Thus, the engagement projection 162 is locked with the elastic engagement piece 165. As a result, the mechanical switch 35 can be mounted onto the buckle main body 3 with a single motion. Accordingly, the efficiency in assembly of the buckle device 1 can be further improved.

Moreover, the lower cover 4 and the upper cover 2 can be mounted after mounting the Hall IC switch 34 and the mechanical switch 35 onto the base member 26 which makes up the buckle main body 3. Accordingly, the efficiency in assembly of the buckle device 1 can be yet further improved.

However, the present invention is not limited to the aspects described in the above embodiment, but various improvements and alterations can be made thereto without departing from the spirit of the present invention.

(A) For example, the torsion spring which urges the inertial mass body 92 of the stopper member 27 in the direction away from the frame member 21 may be directly mounted thereon, and at the same time, the abutment portions 67 may be modified in the height to abut only when the inertial mass body 92 is rotated toward the frame member 21, so that the lever member 28 can be omitted. With this, the total number of components can be reduced.

(B) Further, for example, the lever member 28 may be formed approximately T-shaped in plan view omitting the formation of the projecting pieces 88, and may be arranged at the backside of the operation portion 56 of the slide button 11, and the abutment portion 67 may be provided only at the approximately central point in the width direction of the frame member 21. With this, the configuration of the lever member 28 can further be simplified.

(C) Still further, for example, only one of the Hall IC switch 34 and the mechanical switch 35 may be provided for the buckle main body 3. With this, the total number of components can be reduced.

(D) Further yet, for example, the Hall element 132 in the Hall IC switch 34 may be disposed in the proximity of an end portion on a back side which is opposite to the side where the lead wires 15 are extracted, that is, in the proximity of an end portion closer to the opening 13. Further, the lead wires 15 of the mechanical switch 35 may be soldered to the printed wiring 152B and the printed wiring 153, respectively.

In this case, as illustrated in FIG. 2, when the insertion plate portion 175 of the tongue plate 17 is not inserted in the insertion portion 45, the ejector 22 is slidingly moved by the ejector spring 23 toward the opening 13, and the slider member 24 locked at the tips of the elastic locking pieces 52 of the ejector 22 abuts on the latch supporting frame 61 of the slide button 11. Thereby, as the permanent magnet 25 fixed to the slider member 24 is disposed in the proximity of the Hall IC switch 34, the Hall IC switch 34 outputs an ON signal.

Further, the slide brush 156 of the mechanical switch 35 is slidingly moved toward the opening 13 by the engagement rib 77 of the slider member 24 positioned between the pair of projecting pieces 157, and the printed wirings 152B and 153 are electrically disconnected. As a result, the mechanical switch 35 outputs an OFF signal as the circuit is disconnected through the lead wires 15.

As illustrated in FIG. 20, in the locked state where the tongue plate 17 is inserted in the insertion portion 45 and the engagement piece 126 of the latch 30 is engaged with the engagement hole 176, the ejector 22 is slidingly moved by the insertion plate portion 175 of the tongue plate 17 in the direction lengthwise opposite to the opening 13 with respect to the frame member 21. The slider member 24 engaged at the tips of elastic locking pieces 52 of the ejector 22 is positioned in the proximity of the side wall portion opposite to the latch housing portion 82 of the base member 26. As a result, the permanent magnet 25 fixed in the slider member 24 is positioned away from the Hall element 132 of the Hall IC switch 34, so that the Hall IC switch 34 outputs an OFF signal.

Further, the slide brush 156 of the mechanical switch 35 is slidingly moved by the engagement rib 77 of the slider member 24 positioned between the pair of projecting pieces 157 in the direction toward the engagement projection 161, namely, in the direction opposite to the opening 13, and the printed wirings 152B and 153 are electrically connected. As a result, the mechanical switch 35 outputs an ON signal as the circuit is connected through the lead wires 15.

The invention claimed is:

1. A buckle device having a buckle main body configured to releasably receive a tongue plate connected to webbing, the buckle main body comprising:
   a frame member approximately U-shaped in side view, configured to house the tongue plate inserted therein;
   a slide button provided slidably on an outer surface on one side of the frame member;
   a base member approximately frame-shaped, fixedly provided on the frame member so as to be located above the slide button, the base member having an opening portion formed approximately in a center of the base member;
   a latch member provided in the base member, the latch member being movable in a direction perpendicular to the frame member, and being configured to be engaged with the tongue plate when the tongue plate is inserted, and to be disengaged with the tongue plate by slidingly moving the slide button;
   an ejector member provided in the frame member, the ejector member being movable in an insertion direction and a removal direction of the tongue plate, and being configured to move when pushed by the tongue plate, and to be urged in the removal direction;
   a pair of long holes formed in parallel along a direction of movement of the ejector member, in the one side of the frame member facing the opening portion;
   a slider member approximately portal-shaped in front view, the slider member being mounted on the ejector member through the pair of long holes, and being configured to move within the opening portion integrally with the ejector member;
   a permanent magnet attached on one of two ends in a crosswise direction with respect to movement of the slider member; and
   a magnet position detection unit mounted on the base member on an outer side of a magnet-side side wall which is located closer to the permanent magnet, the magnet position detection unit being configured to detect a position of the permanent magnet in at least one of a state where the tongue plate and the latch member are engaged, and a state where the tongue plate is removed from the frame member,
   wherein the magnet position detection unit comprises:
   a case formed in an approximately rectangular parallelepiped shape, approximately long-quadrangular in plan view, long in the direction of movement of the slider member; and
   first and second locking projections projecting from edge portions closer to the frame member on both lengthwise end faces of the case, respectively, to a predetermined height in the lengthwise direction of the case,
   wherein the base member comprises:
   a projection supporting frame approximately frame-shaped, erected outward to a predetermined height, in a position corresponding to the first locking projection on the magnet-side side wall, the projection supporting frame having a through hole formed therein into which the first locking projection is inserted and fitted; and
   an elastic engagement piece extended obliquely toward the second locking projection from an upper end portion of a wall face portion erected outward to a predetermined height across all width in a width direction of the magnet-side side wall, on a position corresponding to the second locking projection on the magnet-side side wall, the elastic engagement piece elastically deformable in an insertion direction of the magnet position detection unit, and
   wherein the magnet position detection unit is mounted on the outer side of the magnet-side side wall through pushing, while fitting the first locking projection into the projection supporting frame, the second locking projection toward the elastic engagement piece so that the second locking projection is elastically engaged with the elastic engagement piece.

2. The buckle device according to claim 1,
   wherein the buckle main body further comprises:
   a slide switch configured to be mounted on a position adjacent to an outer side of a slide-switch-side side wall opposite to the magnet-side side wall, the slide switch configured to make/break contact by moving a slide brush provided to face the slide-switch-side side wall,
   wherein the base member further comprises:
   a horizontally long notch portion notched to a predetermined height along a lengthwise direction of the slide-switch-side side wall on an edge portion closer to the frame member of the slide-switch-side side wall,
   wherein the slider member comprises:
   an engagement rib approximately L-shaped in side view, the engagement rib being extended outward from an edge portion closer to the frame member on other of the two ends in a crosswise direction with respect to the movement of the slider member, and being configured to be inserted into the horizontally long notch portion, and further being extended approximately vertically along an outer wall face of the slide-switch-side side wall,
   wherein the slide brush comprises:
   a pair of projecting pieces projecting at a back side facing the slide-switch-side side wall, with a predetermined space therebetween along a slide direction of the slide brush, and
   wherein, when the slide switch is mounted adjacent to the outer side of the slide-switch-side side wall and the engagement rib is positioned between the pair of projecting pieces, the slide switch is configured to:
   make/break contact in accordance with the position of the slide brush configured to be slidingly moved along with the movement of the slider member as the engagement rib abuts on the pair of projecting pieces, and
detect at least one of a state where the tongue plate and the latch member are engaged and a state where the tongue plate is removed from the frame member.

* * * * *